US011216803B2

(12) United States Patent
Radu

(10) Patent No.: US 11,216,803 B2
(45) Date of Patent: Jan. 4, 2022

(54) AUTHENTICATION TOKEN FOR WALLET BASED TRANSACTIONS

(71) Applicant: Mastercard International Incorporated, Purchase, NY (US)

(72) Inventor: Cristian Radu, Beauvechain (BE)

(73) Assignee: MASTERCARD INTERNATIONAL INCORPORATED, Purchase, NY (US)

( * ) Notice: Subject to any disclaimer, the term of this patent is extended or adjusted under 35 U.S.C. 154(b) by 390 days.

(21) Appl. No.: 16/103,214

(22) Filed: Aug. 14, 2018

(65) Prior Publication Data

US 2018/0357637 A1 Dec. 13, 2018

Related U.S. Application Data

(62) Division of application No. 14/469,304, filed on Aug. 26, 2014, now Pat. No. 10,078,835.

(60) Provisional application No. 61/948,197, filed on Mar. 5, 2014.

(51) Int. Cl.
*G06Q 20/36* (2012.01)
*G06Q 20/32* (2012.01)
*G06Q 20/22* (2012.01)
*G06Q 20/20* (2012.01)
(Continued)

(52) U.S. Cl.
CPC ......... *G06Q 20/3674* (2013.01); *G06Q 20/20* (2013.01); *G06Q 20/202* (2013.01); *G06Q 20/227* (2013.01); *G06Q 20/322* (2013.01); *G06Q 20/36* (2013.01); *G06Q 20/367* (2013.01); *G06Q 20/3672* (2013.01); *G06Q 20/40* (2013.01); *G06Q 20/401* (2013.01); *G06Q 20/3278* (2013.01); *G06Q 20/382* (2013.01)

(58) Field of Classification Search
CPC .... G06Q 20/20; G06Q 20/202; G06Q 20/227; G06Q 20/36; G06Q 20/367; G06Q 20/3672; G06Q 20/322; G06Q 20/40; G06Q 20/401; G06Q 20/3674
See application file for complete search history.

(56) References Cited

U.S. PATENT DOCUMENTS 7,155,411 B1 * 12/2006 Blinn .................. G06Q 20/02
705/40
7,228,330 B2 6/2007 Vignaud
8,522,025 B2 8/2013 Lakshmeshwar et al.
(Continued)

OTHER PUBLICATIONS

Kabir, Ziaul. "User centric design of an NFC mobile wallet framework." (2011). (Year: 2011).*
(Continued)

*Primary Examiner* — Asfand M Sheikh
(74) *Attorney, Agent, or Firm* — Buckley, Maschoff & Talwalkar LLC

(57) ABSTRACT

Transaction address data is received at a point of interaction (POI) device, from a payment-enabled mobile device. The transaction address data includes first address data and second address data. The first address data identifies a wallet service provider that is associated with the payment-enabled mobile device. The second address data indicates an internet address for a server function present in the payment-enabled mobile device. The first address data is used to dispatch the second address data from the POI device to the wallet service provider.

13 Claims, 19 Drawing Sheets

(51) Int. Cl.
    *G06Q 20/40*     (2012.01)
    *G06Q 20/38*     (2012.01)

(56) References Cited

U.S. PATENT DOCUMENTS

| | | |
|---|---|---|
| 8,762,211 B2 | 6/2014 | Killian et al. |
| 2003/0004869 A1* | 1/2003 | Shigemi ................ G06Q 40/00 705/39 |
| 2003/0055909 A1 | 3/2003 | Hartwig et al. |
| 2004/0019564 A1 | 1/2004 | Goldthwaite et al. |
| 2005/0256802 A1 | 11/2005 | Ammermann et al. |
| 2006/0165060 A1 | 7/2006 | Dua |
| 2007/0022058 A1 | 1/2007 | Labrou et al. |
| 2009/0090783 A1 | 4/2009 | Killian et al. |
| 2011/0087610 A1* | 4/2011 | Batada ................ H04W 12/086 705/318 |
| 2012/0150750 A1 | 6/2012 | Law et al. |
| 2012/0239560 A1 | 9/2012 | Pourallah et al. |
| 2012/0310826 A1 | 12/2012 | Chatterjee |
| 2013/0054454 A1 | 2/2013 | Purves et al. |
| 2013/0191227 A1 | 7/2013 | Pasa et al. |
| 2013/0212007 A1 | 8/2013 | Mattsson et al. |
| 2013/0238456 A1 | 9/2013 | Soysa et al. |
| 2014/0012751 A1* | 1/2014 | Kuhn .................... G06Q 20/32 705/41 |
| 2014/0074569 A1* | 3/2014 | Francis ................ H04L 63/083 705/14.3 |
| 2014/0136353 A1 | 5/2014 | Goldman et al. |
| 2015/0120472 A1 | 4/2015 | Aabye et al. |
| 2015/0235198 A1* | 8/2015 | Liezenberg ......... H04W 12/068 705/44 |
| 2015/0254638 A1 | 9/2015 | Bondesen et al. |
| 2015/0254639 A1 | 9/2015 | Radu |
| 2015/0254662 A1 | 9/2015 | Radu |
| 2016/0092859 A1* | 3/2016 | Klingen ............... G06Q 20/327 705/44 |
| 2016/0180319 A1 | 6/2016 | Klingen et al. |

OTHER PUBLICATIONS

European Office Action dated Aug. 13, 2019 which was issued in connection with EP Patent No. 3114633 which was filed on Mar. 4, 2015.

* cited by examiner

AUTHENTICATION TOKEN FOR WALLET BASED TRANSACTIONS

CROSS REFERENCE TO RELATED APPLICATION

This application is a divisional of U.S. application Ser. No. 14/469,304 filed on Aug. 26, 2014, which claims the benefit of U.S. Provisional Patent Application No. 61/948,197 filed on Mar. 5, 2014, which applications are hereby incorporated by reference in their entirety.

BACKGROUND

Payment cards such as credit cards and debit cards are in widespread use. In some environments, payment cards in the form of magnetic stripe cards prevail in terms of popularity. With mag stripe cards, the payment card account number may be read from the card at the point of sale by a magnetic stripe reader, and then submitted with a transaction authorization request to the account issuer via the payment network.

In other environments, it is more common to use so-called "contactless" payment cards. With contactless payment cards, the payment card account number is stored in an integrated circuit (IC) within the card, and is read by short-range radio communication between the card and the contactless reader component of a point of sale (POS) terminal. With enhancements that have occurred to mobile phones, including smartphones, the capability has been added to perform NFC (near field communication) communications to enable so-called "contactless" payment cards to be digitized into these consumer devices. These mobile devices utilize a secure element (SE) to store the payment card account number and associated data, keys and Personal Identification Number (PIN) to enable the consumer to perform a payment transaction using the NFC short-range radio communications provided by the mobile device and the contactless reader component of a POS terminal.

In still other environments, so-called "contact" payment IC cards are placed in point of sale readers that can read the payment card account number from the card IC via direct conductive contacts provided on the face of the card.

As recent events have underlined, security of payment card account numbers can be a significant issue. Large scale data breaches at the merchant level have occurred and have compromised many cardholders' payment card account numbers. Efforts are ongoing to reduce the risk of theft and misuse of payment card account numbers.

BRIEF DESCRIPTION OF THE DRAWINGS

Features and advantages of some embodiments of the present invention, and the manner in which the same are accomplished, will become more readily apparent upon consideration of the following detailed description of the invention taken in conjunction with the accompanying drawings, which illustrate preferred and exemplary embodiments and which are not necessarily drawn to scale, wherein.

DETAILED DESCRIPTION

In general, and for the purpose of introducing concepts of embodiments of the present invention, a payment network transaction is consummated at the point of sale without the POS terminal receiving or reading a payment card account number. The consumer offers a payment-enabled mobile device as a credential for the transaction. The payment card account number need not be stored in the mobile device, but rather has been enrolled in a digital wallet maintained for the consumer by a wallet service provider (WSP) that is located remotely from the point of sale.

The POS terminal and the payment-enabled mobile device exchange data to initiate the payment transaction. The data provided from the payment-enabled mobile device to the POS terminal may include only (a) data to identify the consumer's WSP, and (b) an internet address for a server function that is hosted by the payment-enabled mobile device. The data provided from the POS terminal to the payment-enabled mobile device may relate to the current purchase transaction (e.g., transaction amount) and to the transaction context (e.g., data to identify the merchant that operates the POS terminal and the location of the purchase transaction).

The exchange of data between the POS terminal and the payment-enabled mobile device may be by any convenient mode, such as NFC.

Using the identity of the WSP as received from the payment-enabled mobile device, the POS terminal may route a message to the WSP, where the message contains the transaction data, the transaction context data and the internet address for the mobile device server function. The WSP may then use the internet address to set up a cryptographically secured communication channel with the mobile device via the server function hosted by the mobile device. This may involve mutual authentication of the WSP's computer and the mobile device server function.

The WSP's computer may transmit wallet form data to the mobile device via the secure channel to permit the consumer to select a payment card account from among those for which data is stored in the digital wallet maintained for the consumer by the WSP. The mobile device server function may send data to the WSP's computer to serve as an authentication token for the transaction, including data that indicates the consumer's selection of a payment card account to be used for the transaction, and data by which the WSP can confirm the validity of the transaction data and transaction context data provided to the WSP from the POS terminal.

The WSP may then act much like an acquirer in a conventional payment card system, by routing an authorization request for the transaction via the payment network to the issuer of the selected payment card account. Upon receiving a favorable authorization response, the WSP may route a confirmation to the POS terminal to indicate that a valid payment for the purchase transaction has been secured. The purchase transaction is then complete at the point of sale.

Figure 1:
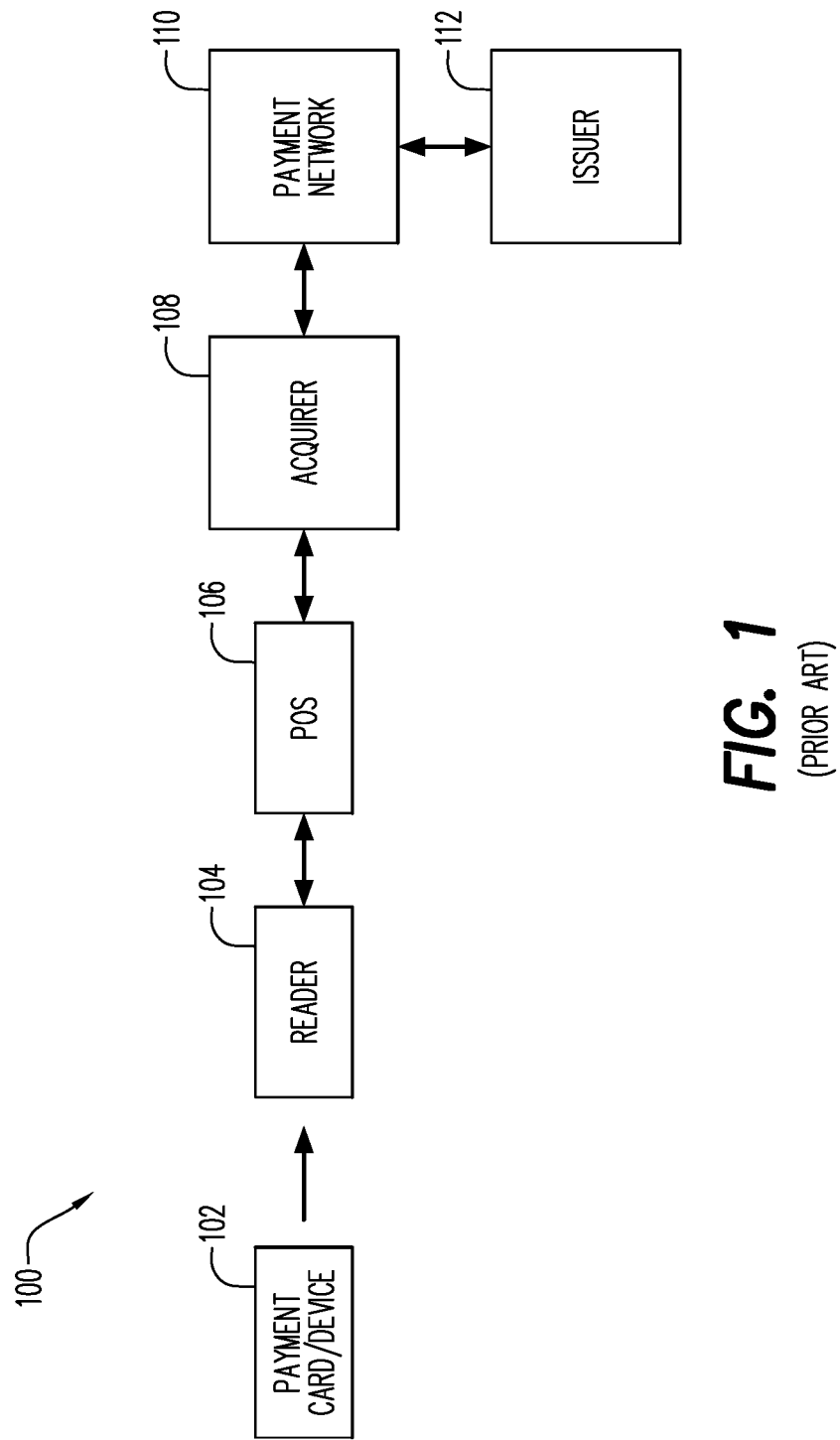
FIG. 1 is a block diagram that illustrates a conventional payment system.

By way of background, and to more sharply illustrate differences between conventional practices and the teachings of the present disclosure, a conventional payment system will first be briefly described. FIG. 1 is a block diagram that illustrates a conventional payment system 100.

The system 100 includes a conventional payment card/device 102 (which may alternatively be a conventional payment-enabled mobile device that stores a payment card account number and runs a payment applet; other form factors for the payment device, such as a fob, are also possible). The system 100 further includes a reader component 104 associated with a POS terminal 106. In some known manner (depending on the type of the payment card/device 102) the reader component 104 is capable of reading the payment card account number and other information from the payment card/device 102.

The reader component 104 and the POS terminal 106 may be located at the premises of a retail store and operated by a sales associate of the retailer for the purpose of processing retail transactions. The payment card/device 102 is shown in FIG. 1 to be interacting with the proximity reader component 104 and the POS terminal 106 for the purpose of executing such a transaction.

A computer 108 operated by an acquirer (acquiring financial institution) is also shown as part of the system 100 in FIG. 1. The acquirer computer 108 may operate in a conventional manner to receive an authorization request for the transaction from the POS terminal 106. The acquirer computer 108 may route the authorization request via a payment network 110 to the server computer 112 operated by the issuer of a payment card account that is associated with the payment card/device 102. As is also well known, the authorization response generated by the payment card issuer server computer 112 may be routed back to the POS terminal 106 via the payment network 110 and the acquirer computer 108.

One well known example of a payment network is referred to as the "Banknet" system, and is operated by MasterCard International Incorporated, which is the assignee hereof.

The payment card issuer server computer 112 may be operated by or on behalf of a financial institution ("FI") that issues payment card accounts to individual users. For example, the payment card issuer server computer 112 may perform such functions as (a) receiving and responding to requests for authorization of payment card account transactions to be charged to payment card accounts issued by the FI; and (b) tracking and storing transactions and maintaining account records.

The components of the system 100 as depicted in FIG. 1 are only those that are needed for processing a single transaction. A typical payment system may process many purchase transactions (including simultaneous transactions) and may include a considerable number of payment card issuers and their computers, a considerable number of acquirers and their computers, and numerous merchants and their POS terminals and associated proximity reader components. The system may also include a very large number of payment card account holders, who carry payment cards or other devices for initiating payment transactions by presenting an associated payment card account number to the reader component of a POS terminal.

Figure 2:
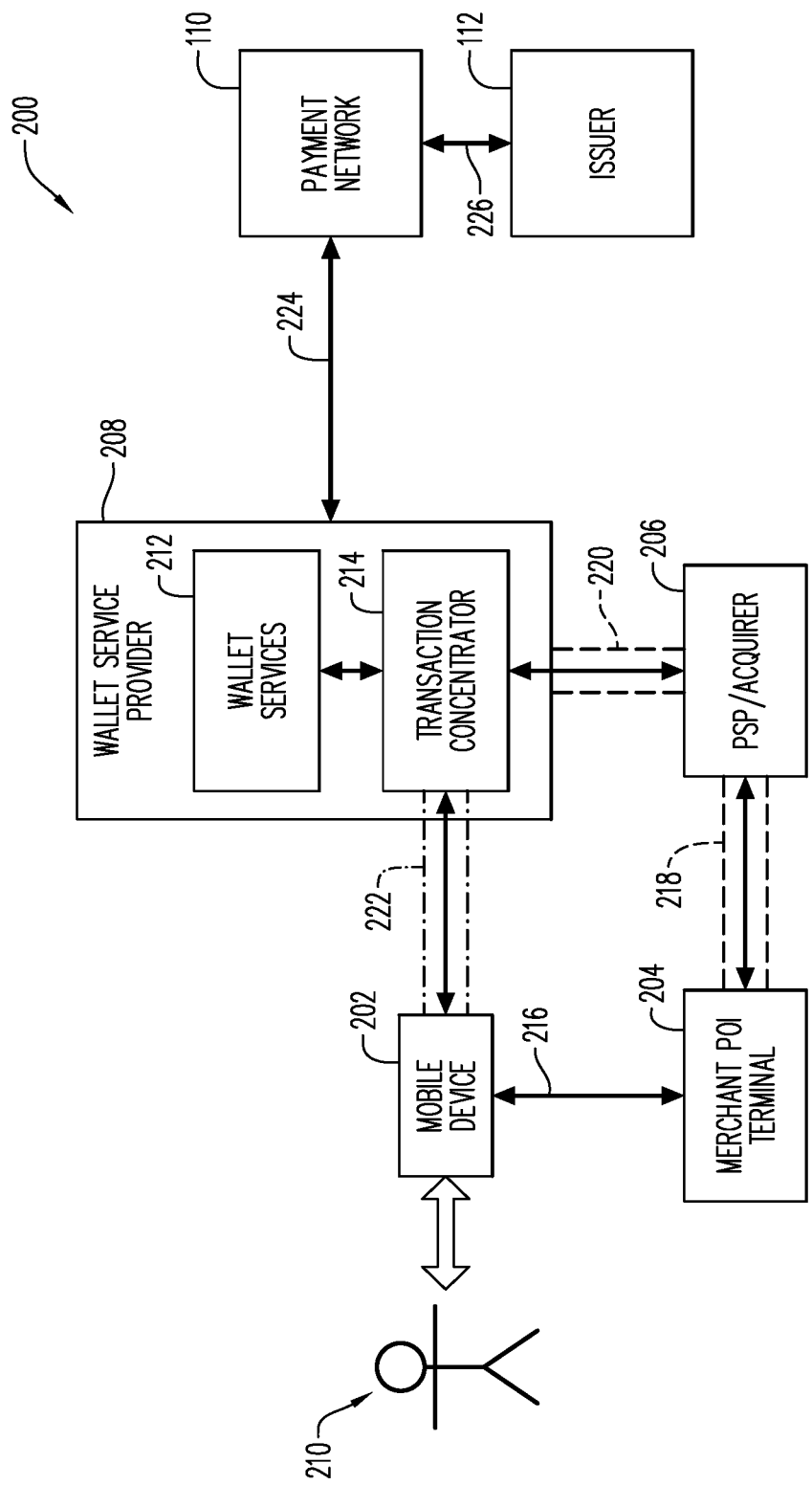
FIG. 2 is a block diagram that illustrates a payment system provided in accordance with aspects of the present invention.

FIG. 2 is a block diagram that illustrates a payment system 200 provided in accordance with aspects of the present invention. (As was the case in FIG. 1, the payment system is depicted in FIG. 2 only in terms of components needed for a single transaction; in practice, and as will be discussed below, the payment system 200 may include many more instances of at least some components.)

As illustrated in FIG. 2, the payment system 200 includes a payment-enabled mobile device 202 provided in accordance with aspects of the present invention. The payment-enabled mobile device 202 may take the form of a conventional-appearing smartphone, tablet computer, or the like. However, as will be seen from subsequent discussion, the software configuration of the payment-enabled mobile device 202 may be very different from previously proposed payment-enabled devices. In at least some embodiments, the payment-enabled mobile device 202 may not store any payment card account information, and may lack the payment applets that have heretofore typically been proposed to incorporate contactless payment capabilities into a mobile phone. Further details of the payment-enabled mobile device 202 will be described below, particularly in the ensuing sections of this description relating to FIGS. 3, 7, 8 and 9, and in portions of FIGS. 11A and 11B.

Also included in the payment system 200 is a merchant point-of-interaction (POI) terminal 204, which may be a POS terminal as configured in accordance with aspects of the present invention. The merchant POI terminal 204 may, for example, be operated by a merchant (or merchant employee) at a retail store, and may interact with the payment-enabled mobile device 202 in a manner described below (e.g., by a short-range mode of data communication). Further details of the merchant POI terminal 204 will be described subsequently, including in the sections of the description relating to FIGS. 4 and 10.

Another feature of the payment system 200 is a computer 206 operated by a payment system acquirer (or a payment services provider—"PSP") on behalf of an acquirer. As is customary, the acquirer may be a financial institution with which the merchant maintains a banking relationship. However, as will be seen from subsequent discussion, the roles of the PSP/acquirer computer 206 in the payment system may be quite different from the roles typically performed by the acquirer in a conventional payment system such as that illustrated in FIG. 1. A portion of the ensuing discussion will describe actions taken by the PSP/acquirer, and the computer 206, in connection with a typical payment transaction as performed in the payment system 200.

A central aspect and component of the payment system 200 is a computer 208 operated by or on behalf of a wallet service provider (WSP). It is assumed that the WSP in question maintains a digital wallet for an individual user depicted at 210 as the user of the payment-enabled mobile device 202. Two main functional blocks of the WSP computer 208 are shown in FIG. 2, namely a wallet services block 212 and a transaction concentrator block 214. The wallet services block 212 enrolls consumers for digital wallet services, and allows consumers' payment card accounts to be represented in digital form in the consumers' digital wallets to be maintained in the wallet services block 212. The wallet services block 212 also serves as a repository and as a resource for digital wallet and payment card account information to be used—as will be seen—in payment transactions that are performed in accordance with aspects of the present invention.

The transaction concentrator block 214 handles individual payment transactions in accordance with aspects of the present invention and as described in detail below.

Also shown in FIG. 2, and forming part of the payment system 200, are the payment network 110 and the issuer server computer 112 which were mentioned in the above description of FIG. 1. Operation of the payment system 200 does not necessarily require that the payment network 110 and the issuer server computer 112 be operated in other than a conventional manner, and thus the payment network 110 and the issuer server computer 112 may be constituted in a known manner; it should be noted though that in effect, and as will be seen, the WSP computer 208 may serve (among other roles) in the place of the acquirer computer 108 that was depicted in FIG. 1. Thus, and as described below, the payment network 110 may receive authorization requests from the WSP computer 208 as if (from the point of view of the payment network 110) the WSP computer 208 were an acquirer computer.

FIG. 2 also shows communication channels 216, 218, 220 and 222 interconnecting certain of the components of the payment system 200. Further information about these communication channels will be provided below. It should also be noted that communication channel 224 (between the WSP computer 208 and the payment network 110) and communication channel 226 (between the payment network 110 and the issuer server computer 112) may be provided in a conventional manner.

A detailed description of operation of the payment system 200 will be provided below, particularly with reference to FIGS. 11A and 11B.

As noted above, the block diagram representation of the payment system 200 as shown in FIG. 2 represents only system components required for a single transaction. In a practical embodiment of the payment system 200, there may be, for example, more than one payment network that participates in the system. Also, there may be a number of WSPs that participate rather than just one.

Moreover, as will be understood from the above description of a conventional payment system, the payment system 200 may process many transactions, including simultaneous transactions. A considerable number of payment card account issuers may be included in the payment system 200, and the payment system 200 may also include a considerable number of acquirers/PSPs and their computers. In addition, the payment system 200 may include a large number of merchant POI devices (in-store and/or e-commerce host computers), operated by a large number of merchants. Also, there may be a very large number of payment-enabled mobile devices as described herein (each including the above-mentioned server function which has a unique URI), and owned/used by numerous individual users. The users are holders of payment card accounts issued by issuing financial institutions and have enrolled with one or more WSPs, which maintain digital wallets for the users.

Figure 3:
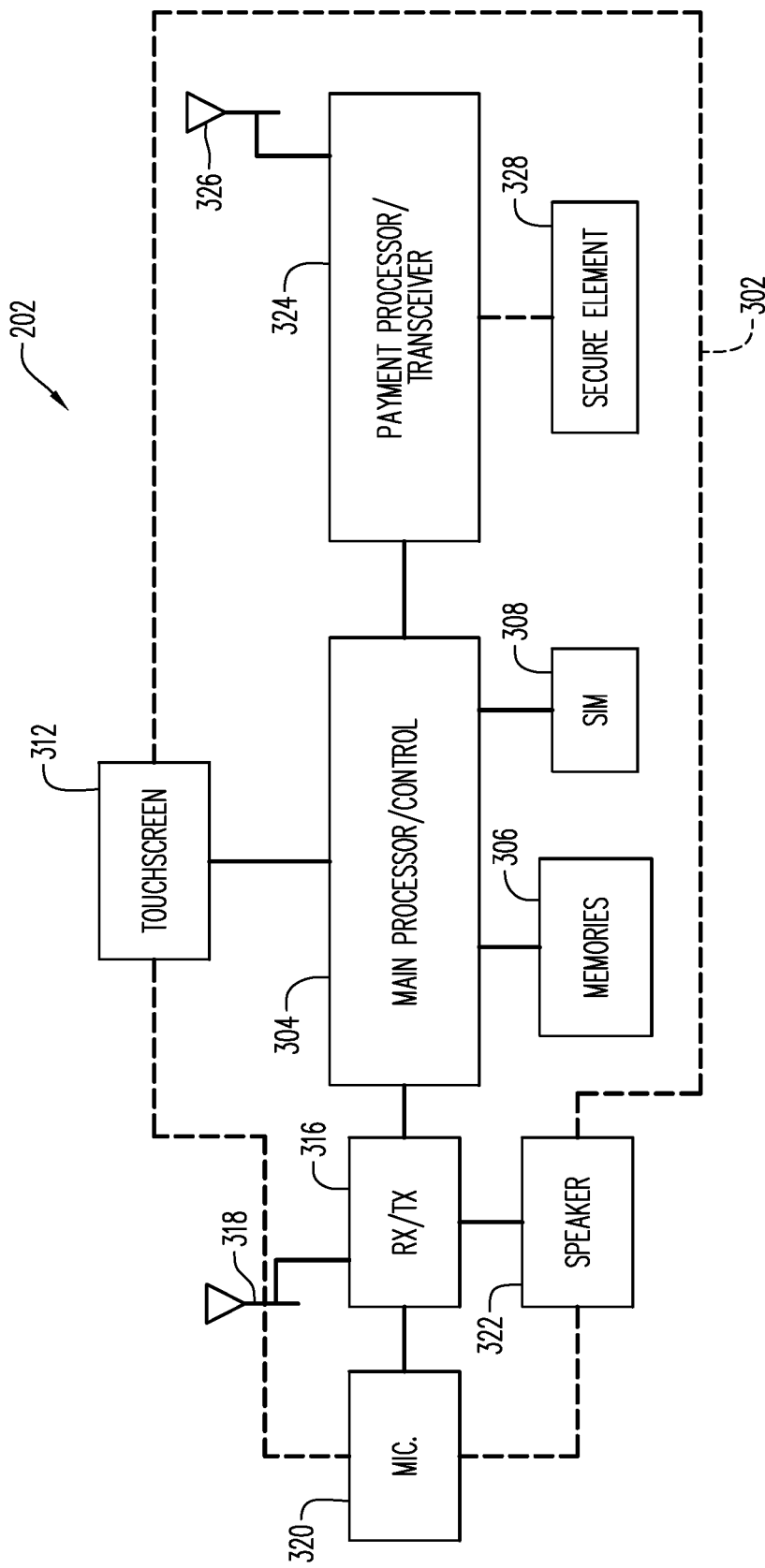
FIG. 3 is a block diagram that illustrates a payment-enabled mobile telephone provided in accordance with aspects of the present invention and that may be used in connection with the system of FIG. 2.

FIG. 3 is a block diagram that illustrates an example embodiment of the payment-enabled mobile device 202 shown in FIG. 2 and provided in accordance with aspects of the present invention. The payment-enabled mobile device 202 may be conventional in its hardware aspects. For example, the payment-enabled mobile device 202 may be a smartphone, and may resemble, in some or all of its hardware aspects and many of its functions, a conventional "iPhone" marketed by Apple Inc., or one of the numerous smartphone models that run the "Android" operating system. Alternatively, the payment-enabled mobile device 202 may be a tablet computer, such as the "iPad" marketed by Apple Inc. The ensuing description of the payment-enabled mobile device 202 is based on the assumption that it is embodied as a smartphone; those who are skilled in the art will readily understand from the following description, and from following descriptions of software aspects of the payment-enabled mobile device 202, how to embody the payment-enabled mobile device 202 as a tablet computer or other device apart from a smartphone.

The payment-enabled mobile device 202 may include a conventional housing (indicated by dashed line 302 in FIG. 3) that contains and/or supports the other components of the payment-enabled mobile device 202. The housing 302 may be shaped and sized to be held in a user's hand, and may for example exhibit the type of form factor that is common with the current generation of smartphones.

The payment-enabled mobile device 202 further includes conventional control circuitry 304, for controlling over-all operation of the payment-enabled mobile device 202. For example, the control circuitry 304 may include a conventional processor of the type designed to be the "brains" of a smartphone.

Other components of the payment-enabled mobile device 202, which are in communication with and/or controlled by the control circuitry 304, include: (a) one or more memory devices 306 (e.g., program and working memory, etc.); (b) a conventional SIM (subscriber identification module) card 308; (c) a conventional touchscreen 312 which serves as the primary input/output device for the payment-enabled mobile device 202, and which thus receives input information from the user and displays output information to the user. As is the case with many models of smartphones, in some embodiments the payment-enabled mobile device 202 may also include a few physically-actuatable switches/controls (not shown), such as an on/off/reset switch, a menu button, a "back" button, a volume control switch, etc. It may also be the case that the payment-enabled mobile device 202 includes a conventional digital camera (as is the case with many smartphones), which is not shown.

The payment-enabled mobile device 202 also includes conventional receive/transmit circuitry 316 that is also in communication with and/or controlled by the control circuitry 304. The receive/transmit circuitry 316 is coupled to an antenna 318 and provides the communication channel(s) by which the payment-enabled mobile device 202 communicates via the mobile telephone communication network (not shown). The receive/transmit circuitry 316 may operate both to receive and transmit voice signals, in addition to performing data communication functions. As is known to those who are skilled in the art, such data communication may be via HTTP (HyperText Transfer Protocol) or other communication protocol suitable for carrying out data communication over the internet.

The payment-enabled mobile device 202 further includes a conventional microphone 320, coupled to the receive/transmit circuitry 316. Of course, the microphone 320 is for receiving voice input from the user. In addition, a loudspeaker 322 is included to provide sound output to the user, and is coupled to the receive/transmit circuitry 316.

The receive/transmit circuitry 316 may operate in a conventional fashion to transmit, via the antenna 318, voice signals generated by the microphone 320, and to reproduce, via the loudspeaker 322, voice signals received via the antenna 318. The receive/transmit circuitry 316 may also handle transmission and reception of text messages and other data communications via the antenna 318.

The payment-enabled mobile device 202 may also include circuitry 324 that is partly or wholly dedicated to implementing NFC communications functionality of the payment-enabled mobile device 202. The payment-enabled mobile device 202 may further include a loop antenna 326, coupled to the NFC circuitry 324. In some embodiments, the NFC circuitry 324 may partially overlap with the control circuitry 304 for the payment-enabled mobile device 202. Moreover, the NFC circuitry 324 is associated with, and may also overlap with, a secure element 328 that is part of the payment-enabled mobile device 202 and is contained within the housing 302, or the NFC circuitry could be omitted in embodiments that do not utilize NFC. The term "secure element" is well known to those who are skilled in the art, and typically refers to a device that may include a small processor and volatile and nonvolatile memory (not separately shown) that are secured from tampering and/or reprogramming by suitable measures. In some embodiments, the secure element 328 may be provided as part of the SIM card 308. In other embodiments, the secure element 328 may be constituted by an integrated circuit card separate from the SIM card 308 but possibly having the same form factor as the SIM card 308. In some embodiments of the payment-enabled mobile device 202, the secure element 328 may be conventional in its hardware aspects but may be programmed in accordance with aspects of the present invention in a manner to be described below. (It should be noted that the term "secure element" is not intended to be limited to devices that are IC-based, but rather may also include any secure execution environment in a mobile device, and may include software based secure execution environments running on the main mobile device processor.)

It should also be understood that the payment-enabled mobile device 202 may be operable as a conventional mobile telephone for communication—both voice and data—over a conventional mobile telecommunications network, which is not depicted in the drawing. Thus, the payment-enabled mobile device 202 may be in communication from time to time in a conventional manner with a mobile network operator ("MNO"—also not shown). For example, an over-the air communication channel (of which an example is communication channel 222 in FIG. 2, as discussed further below) may be established between the payment-enabled mobile device 202 and a remote computer (e.g., the WSP computer 208).

Later sections of this disclosure, including those related to FIGS. 7-9, will discuss software aspects of the payment-enabled mobile device 202, as provided in accordance with aspects of the present invention.

Figure 4:
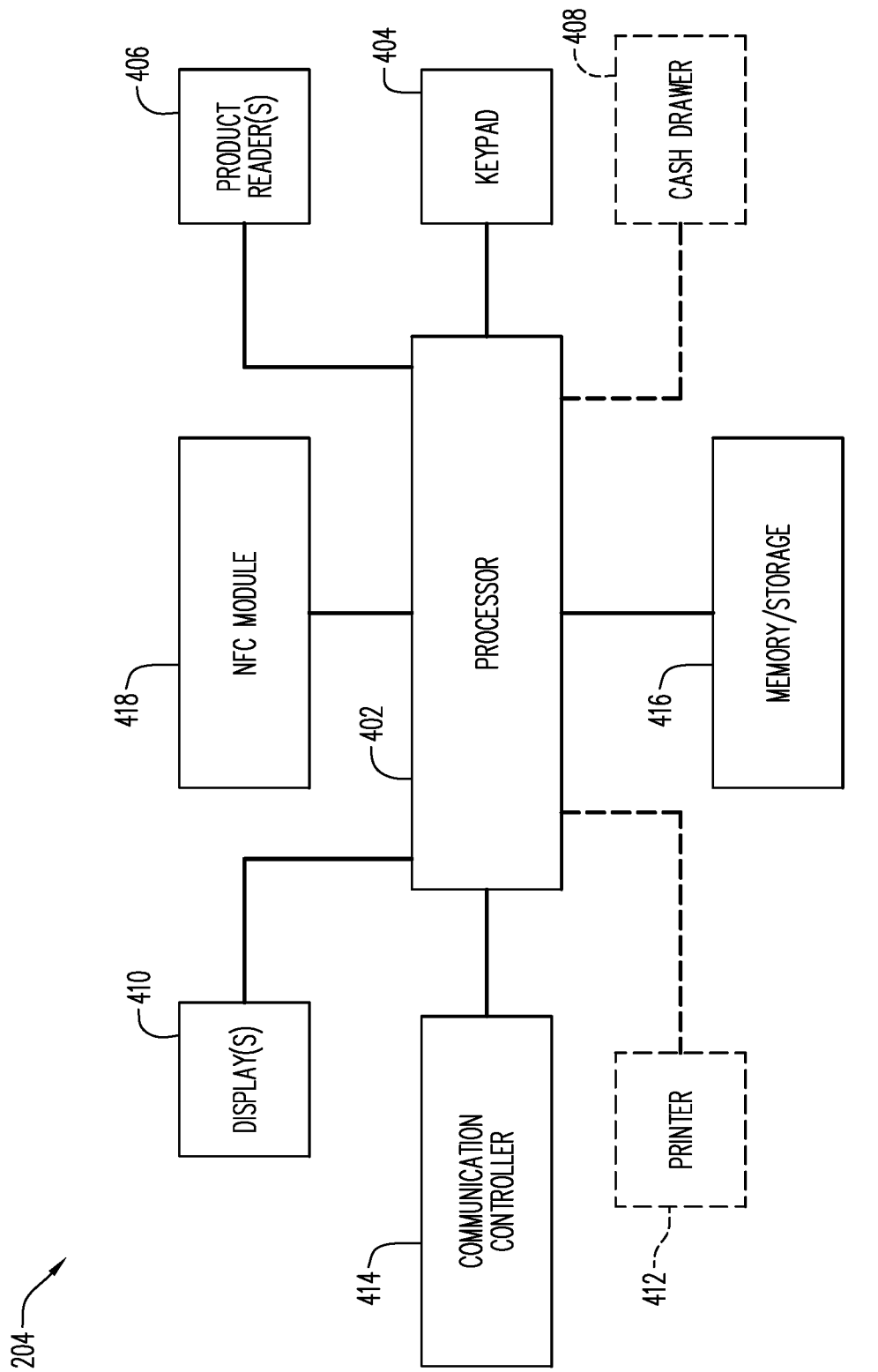
FIG. 4 is a block diagram that illustrates a point of sale (POS) terminal provided in accordance with aspects of the present invention and that may be part of the system of FIG. 2.

FIG. 4 is a block diagram that illustrates the merchant POI terminal 204 shown in FIG. 2 and provided in accordance with aspects of the present invention; as noted above, the merchant POI terminal 204 may be embodied as a POS terminal at a retail store.

In some embodiments, the merchant POI terminal 204 may be largely or entirely conventional in its hardware aspects (with the possible exception of cost reductions that may be facilitated by teachings of this disclosure, as described below). Nevertheless, the merchant POI terminal 204 may be programmed in accordance with aspects of the present disclosure to provide functionality as described herein. In addition to the below description of functional process steps performed by the merchant POI terminal 204 as part of a typical purchase transaction (e.g., in connection with FIGS. 11A and 11B—see below), there will also be discussion below of some software aspects of the merchant POI terminal 204 in connection with FIG. 10. For now, however, a brief description of hardware aspects of the merchant POI terminal 204 will follow, with continued reference to FIG. 4.

The merchant POI terminal 204 may include a processing element (or elements) such as the processor 402 shown in FIG. 4. The processor 402 may, for example, be a conventional microprocessor, and may operate to control the overall functioning of the merchant POI terminal 204.

The merchant POI terminal 204 may also include conventional peripheral components, in communication with and/or controlled by the processor 402, such as: (a) a keypad 404 for receiving input from the human operator of the POS terminal; (b) a product reader 406 for reading any form of unique product identifier, such as a barcode or RFID, that appears on, or is attached to, products brought to the terminal for purchase; (c) a cash drawer 408 for storing cash received from customers; (d) one or more displays 410 for providing output (e.g., identifying products presented for purchase and their prices, indicating sales tax due, indicating transaction subtotals and totals, etc., providing prompts to the customer and/or to the sales associate); (e) a printer 412 for printing out sales receipts; and (f) a communication controller 414 for allowing the processor 402, and hence, the merchant POI terminal 204 to engage in communication over data networks with other devices (e.g., the PSP/acquirer computer 206, FIG. 2). (In some embodiments, at least one of the displays 410 may be a touch screen, so as to provide an input function as well as an output function.)

In addition, the merchant POI terminal 204 may include one or more memory and/or data storage devices (indicated collectively at 416), which may comprise any combination of one or more of a hard disk drive, RAM (random access memory), ROM (read only memory), flash memory, etc. The memory/data storage device(s) 416 may store software and/or firmware that programs the processor 402 and the merchant POI terminal 204 to perform functionality as described herein. Thus the memory/data storage device(s) 416 may be in communication with the processor 402.

Further, the merchant POI terminal 204 may include one or more housings (not shown) which contain and/or support one or more of the other components shown in FIG. 4.

In some embodiments, the merchant POI terminal 204 may depart from the customary hardware configuration of POS terminals, in that it may lack the usual card-reader elements such as a mag stripe reader, a contact IC card reader, a contactless IC card reader, etc. Instead, the merchant POI terminal 204 may include a suitable hardware arrangement to allow for local communications with the payment-enabled mobile device 202, to thereby establish the communication channel indicated at 216 in FIG. 2.

Referring again to FIG. 4, it is assumed for this example embodiment of the payment-enabled mobile device 202 that it is configured to communicate via NFC with the payment-enabled mobile device 202 and accordingly the merchant POI terminal 204 includes an NFC module (reference numeral 418) for that purpose. The NFC module 418 is in communication with the processor 402.

With the absence of card-reading capability, and also with no need to provide security measures to safeguard PANs (primary account numbers) and other sensitive consumer information (because, as will be seen, such information is never received in the merchant POI terminal 204 according to the processes contemplated herein), it may be possible to greatly simplify the merchant POI terminal 204 and to reduce it in cost in comparison to widely used models of POS terminals. Nevertheless, alternative embodiments of the merchant POI terminal 204 are also contemplated in which, to accommodate legacy technology, card-reader(s), etc., are included so that the merchant POI terminal 204 may read conventional payment cards in addition to accepting payment via the payment-enabled mobile device 202 as described herein.

Figure 5:
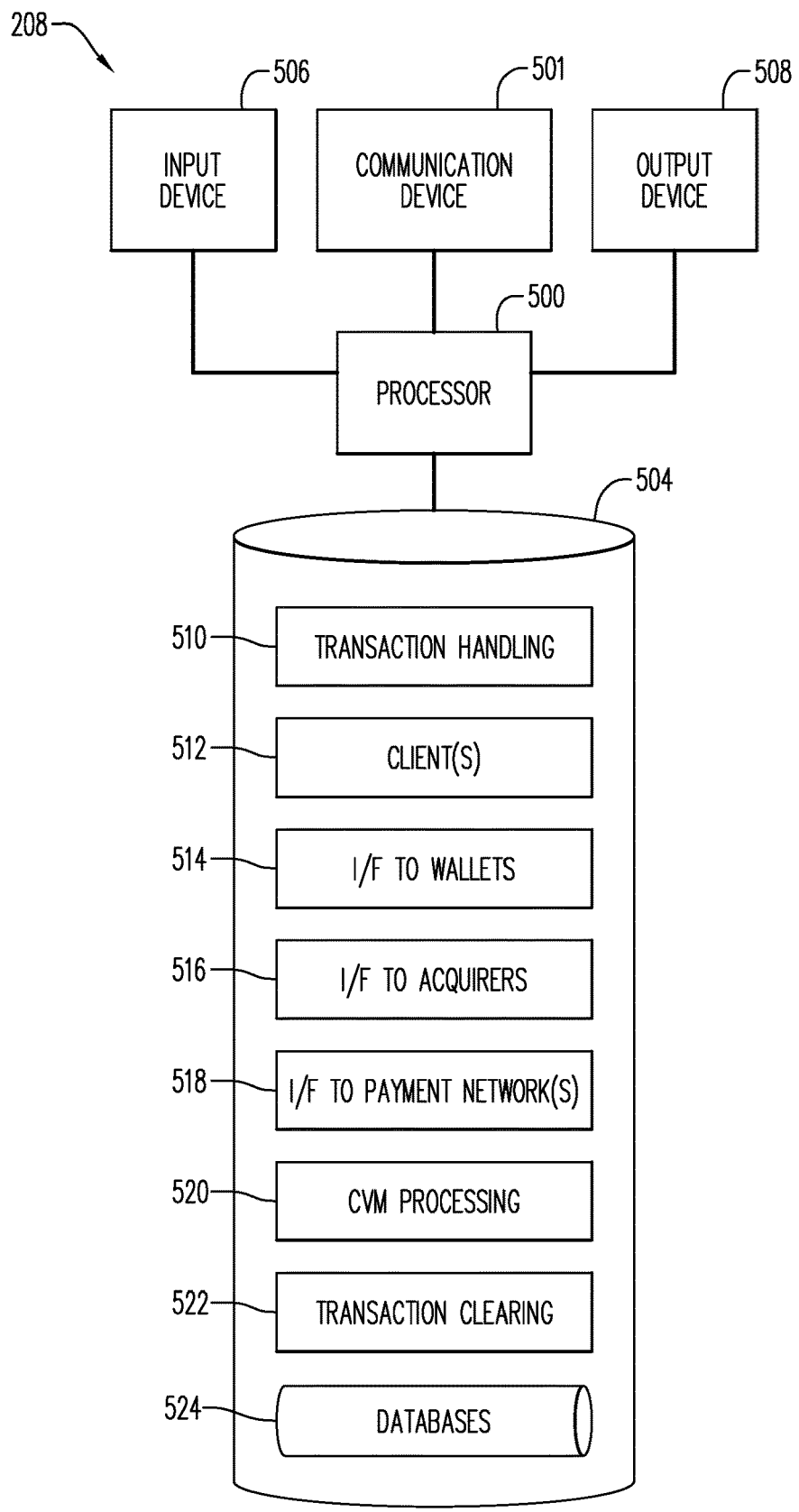
FIG. 5 is a block diagram that illustrates a computer system that may be operated by a wallet service provider as part of the system of FIG. 2 and in accordance with aspects of the present invention.

FIG. 5 is a block diagram that illustrates an example embodiment of the WSP computer 208 as shown in FIG. 2 and provided in accordance with aspects of the present invention.

Referring now to FIG. 5, the WSP computer 208 may be conventional in its hardware aspects but may be controlled by software to cause it to function as described herein. For example, the WSP computer 208 may be constituted by conventional server computer hardware. It should be noted however that (as discussed below) the WSP computer 208 may function as a client device in its interactions with a server function present on the payment-enabled mobile device 202.

The WSP computer 208 may include a computer processor 500 operatively coupled to a communication device 501, a storage device 504, an input device 506 and an output device 508.

The computer processor 500 may be constituted by one or more conventional processors. Processor 500 operates to execute processor-executable steps, contained in program instructions described below, so as to control the WSP computer 208 to provide desired functionality.

Communication device 501 may be used to facilitate communication with, for example, other devices (such as one or more computers operated by the payment network 110, the PSP/acquirer computer 206 and/or computers operated by other acquirers/PSPs, and numerous payment-enabled mobile devices such as the device 202 depicted in FIGS. 2 and 3). For example (and continuing to refer to FIG. 5), communication device 501 may comprise numerous communication ports (not separately shown), to allow the WSP computer 208 to communicate simultaneously with a number of other computers and other devices, including communications as required to simultaneously handle numerous payment transactions.

Input device 506 may comprise one or more of any type of peripheral device typically used to input data into a computer. For example, the input device 506 may include a keyboard and a mouse. Output device 508 may comprise, for example, a display and/or a printer.

Storage device 504 may comprise any appropriate information storage device, including combinations of magnetic storage devices (e.g., hard disk drives), optical storage devices such as CDs and/or DVDs, and/or semiconductor memory devices such as Random Access Memory (RAM) devices and Read Only Memory (ROM) devices, as well as so-called flash memory. Any one or more of such information storage devices may be considered to be a computer-readable storage medium or a computer usable medium or a memory.

Storage device 504 stores one or more programs for controlling processor 500. The programs comprise program instructions (which may be referred to as computer readable program code means) that contain processor-executable process steps of the WSP computer 208, executed by the processor 500 to cause the WSP computer 208 to function as described herein.

The programs may include one or more conventional operating systems (not shown) that control the processor 500 so as to manage and coordinate activities and sharing of resources in the WSP computer 208, and to serve as a host for application programs (described below) that run on the WSP computer 208.

The programs stored in the storage device 504 may also include a transaction handling application program 510 that controls the processor 500 to enable the WSP computer 208 to handle requests for payment transactions in a manner described below in connection with FIGS. 11A and 11B.

The storage device 504 may also store numerous instances of client software programs 512 that control the processor 500 to enable the WSP computer 208 to play a client role with respect to server functions hosted in numerous payment-enabled mobile devices (as provided in accordance with aspects of the present invention) with which the WSP computer 208 may communicate at a given time.

In addition, the storage device 504 may store a wallet interface program 514 by which the processor 500 may access digital wallet data stored in the WSP computer 208 with respect to numerous users of the payment system 200.

Still further, the storage device 504 may store an acquirer interface program 516, which provides a data communications interface to the PSP/acquirer computer 206 (FIG. 2) and to other acquirer computers that present requests for transactions to the WSP computer 208.

Continuing to refer to FIG. 5, the storage device 504 may also store a payment network interface program 518, which provides a data communications interface to the payment network 110 (FIG. 2)—and possibly to other payment networks as well—to allow for submission of authorization requests by the WSP computer 208 and receipt of authorization responses.

Again continuing to refer to FIG. 5, the storage device 504 may additionally store a CVM (cardholder verification method) processing program 520, which operates to handle required CVM processing with respect to consumers who access the payment system 200 via their mobile devices (as will be described further below).

Moreover, the storage device 504 may store a transaction clearing program 522, which may handle clearing of payment transactions handled via the WSP computer 208.

The storage device 504 may also store, and the WSP computer 208 may also execute, other programs, which are not shown. For example, such programs may include a reporting application, which may respond to requests from system administrators for reports on the activities performed by the WSP computer 208. The other programs may also include, e.g., one or more data communication programs, device drivers, etc.

The storage device 504 may also store one or more databases 524 required for operation of the WSP computer 208. Such databases may include, for example, a database (not separately indicated in FIG. 5) for storing data corresponding to digital wallets maintained for consumers/cardholders in the WSP computer 208.

Like the WSP computer 208, the PSP/acquirer computer 206 may be constituted by conventional computer hardware; thus the PSP/acquirer computer 206 may have the same hardware architecture and aspects as described above in connection with the description of the WSP computer. The computer hardware making up the PSP/acquirer computer 206 may be programmed to cause the PSP/acquirer computer 206 to perform functions such as are described below.

Figure 6:
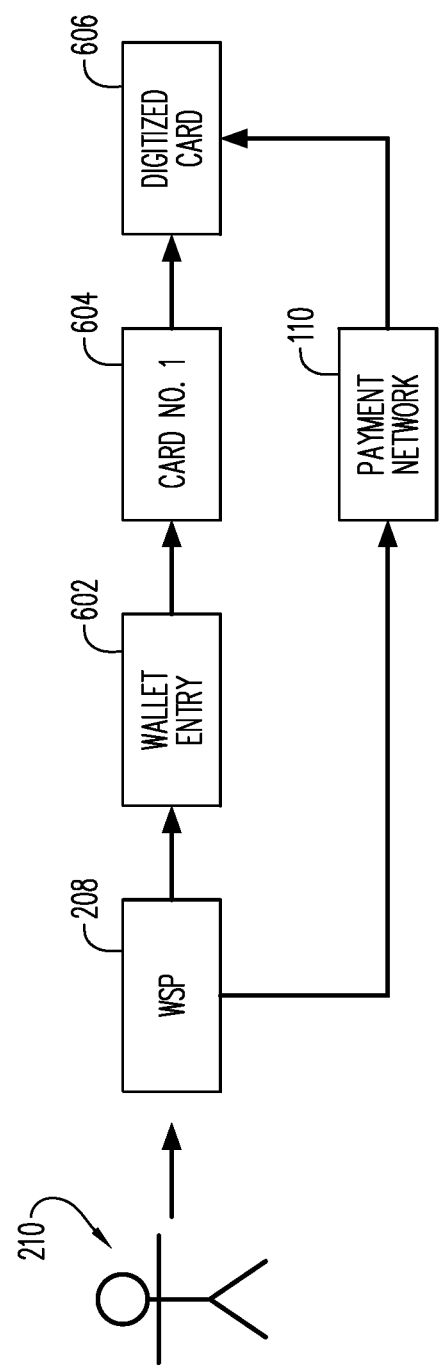
FIG. 6 schematically represents enrollment of a payment card account with a wallet service provider that participates in the system of FIG. 2.

FIG. 6 schematically represents enrollment of a payment card account with a wallet service provider (e.g., the operator of WSP 208) that participates in the payment system 200 of FIG. 2. In FIG. 6, the block that represents the WSP is labeled with reference numeral 208 which it shares with WSP computer 208 of FIGS. 2 and 5. Each WSP in the system (only one WSP is depicted but there may be a considerable number that participate in the system) has a particular identifier to distinguish the WSP from other WSPs in the system. For example, the WSP service provided by the assignee hereof (MasterCard International Incorporated) is identified as "MasterPass". A similar service available from Visa Inc. is identified as "V.me". It is assumed that the wallet services provided by WSP 208 are "financial" in the sense that the accounts stored in the consumers' digital wallets maintained by WSP 208 are financial accounts. Other types of wallet services may also be provided, such as "value added services" (VAS) wallets, as will be described below (for instance, in connection with FIG. 13).

A user/consumer 210 is depicted in FIG. 6; this individual—it is assumed—wishes to have one of his/her payment card accounts added to his/her digital wallet 602 maintained for him/her by the WSP 208. It should be understood that each consumer's digital wallet may exist as a unique entry for the consumer in a database maintained by the WSP/WSP computer 208. The consumer's entry/digital wallet may be identified with a unique identifier for the entry. In some embodiments of the invention, the unique identifier for the consumer's digital wallet may be a Universal Resource Identifier (URI) that has been assigned to a server function hosted on the consumer's mobile device 202 (FIG. 2). (As is known to those who are skilled in the art, a URI uniquely identifies a point of content in internet space, and thus may serve as an internet address.) It should also be noted that each consumer may be registered with—and hence have a respective digital wallet with—more than one WSP. In each case, for WSPs that participate in the payment system 200, the consumer's respective digital wallet may be identified by the same identifier across all the WSPs, namely by the just-mentioned URI for the server function hosted on the consumer mobile device 202.

Each consumer's digital wallet/WSP entry 602 may itself be a data repository for storing digitalized payment cards that the consumer has selected for inclusion in his/her digital wallet. The digitalized cards may be issued by the same issuing financial institution or by several different issuers. The digitalized cards may all be branded from the same payment network or from more than one payment network. Inclusion of digitalized cards from a given payment network in the WSP 208's database (i.e., in consumers' digital wallets maintained by WSP 208) can occur if the WSP 208 has entered into a relationship with that payment network to allow the WSP to act as a quasi-acquirer with respect to that payment network.

Block 604 in FIG. 6 represents one of the user 210's payment card accounts that the user has elected to have included in his/her digital wallet 602 as a digitalized card 606. The particular digitalized card 606 may be assigned an easy-to-recognize identifier to distinguish it (for the user) from other digitalized cards (not shown) that are also present in the user's digital wallet 602.

For each digitalized card 606 in the user's digital wallet 602, there is a digitalized image of the payment card account stored in the WSP computer 208. The digitalized image consists of the personalization template of the card application (i.e., a software application for digitally implementing the payment card account). The items included in the digitalized image depend on the requirements for wallet based transactions as established by the payment network for which the payment card account was issued.

The WSP computer 208 implements an engine that emulates the card payment application for the digitalized card 606. It can be said that the digitalized card 606 is made up of the digitalized image/personalization template for the particular payment card account plus the WSP engine for the relevant card payment application. As will be seen, the WSP 208 uses the digitalized payment card 606 to trigger and complete wallet payment transactions in place of the payment account card itself.

It will be noted that every payment network is likely to require the PAN and the expiration date for the digitalized card image. Some payment networks may also require a Card Authentication Method (CAM). For example, a static CAM may be required, such as the CVC2 as established by MasterCard or the CVV as established by Visa. Alternatively, a dynamic CAM may be required, such as is provided in an EMV transaction. (As is known to those who are skilled in the art, EMV is a standard for inter-operation of IC cards with POS terminals and/or ATMs.) For a digitalized card for which EMV is required as a CAM/CVM, the WSP computer 208 itself may run an EMV engine. Some payment networks may require a specific CVM, such as a biometric (e.g., voice recognition in real time and/or face motion recognition), for each transaction. Other types of CAM/CVM requirements are also possible and/or contemplated, and some others will be discussed below. In some embodiments, the issuer of the payment card account may specify one or more CVMs instead of or in addition to CVM(s) required by the payment network.

Figure 7:
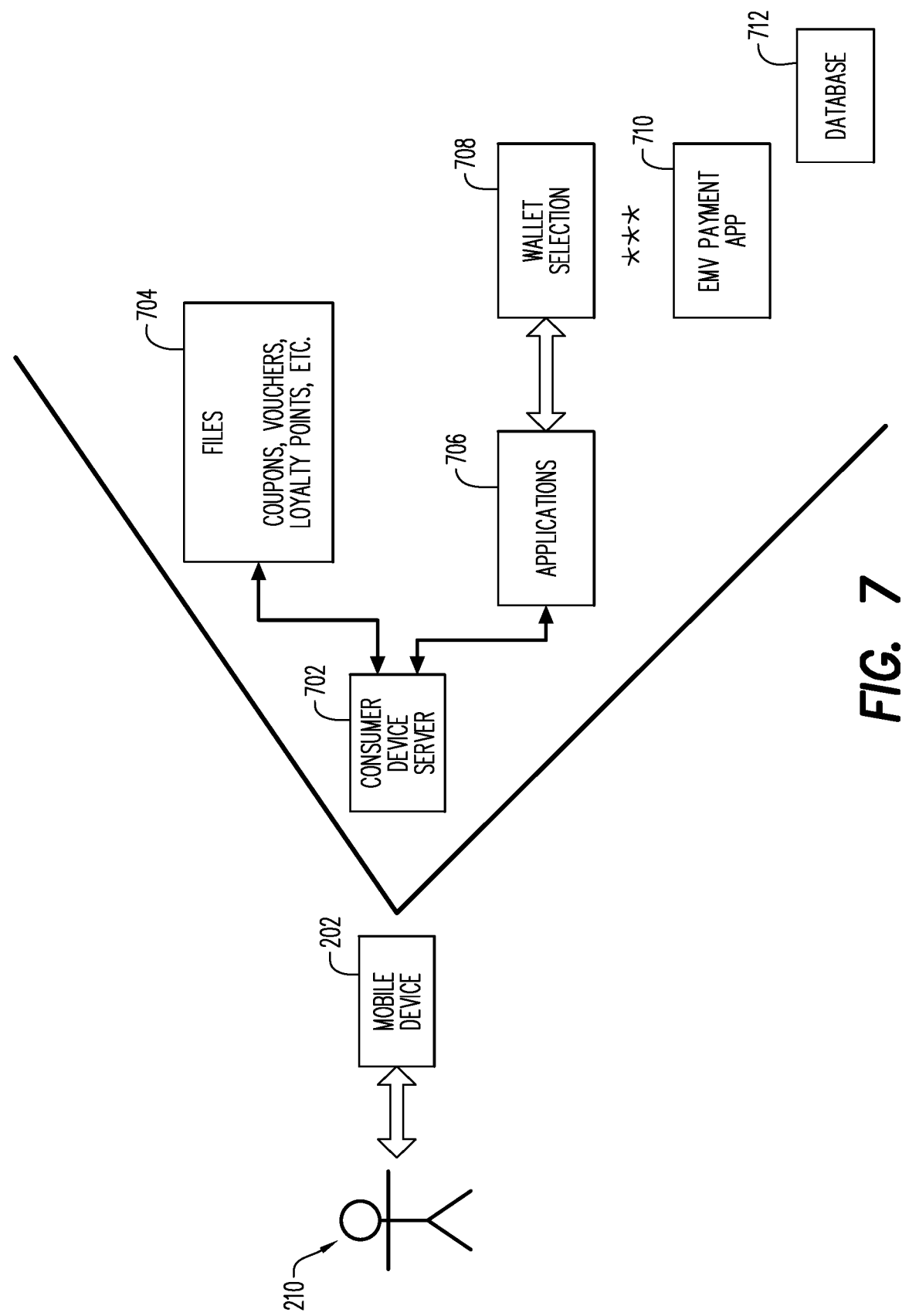
FIG. 7 schematically illustrates software and functional aspects of the payment-enabled mobile telephone of FIG. 3.

FIG. 7 schematically illustrates software and functional aspects of the payment-enabled mobile device 202 shown in FIGS. 2 and 3.

The payment-enabled mobile device 202 serves as the credential of the user 210 with respect to the payment system 200 and also is the mechanism by which the user 210 is able to initiate and perform payment transactions and otherwise to interact with the payment system 200.

One salient feature of the payment-enabled mobile device 202 is that it hosts a server function, represented at block 702 in FIG. 7. This function will sometimes be referred to as the consumer device server function. In some embodiments, the consumer device server function 702 may be implemented in accordance with the Smart Card Web Server (SCWS) standard promulgated by the Open Mobile Alliance (OMA), and may run on the SIM card 308 (FIG. 3) and/or the secure element 328. Alternatively, the consumer device server function 702 may be implemented in accordance with the GlobalPlatform Networked Framework. The latter may be advantageous in that it supports unlimited quantities of data per communication and thus removes the need to segment data, as may be required in an SCWS implementation.

The WSP 208 may fulfill the role of parameterizing the consumer device server function 702. The parameters to be provided may include the WSP's identifier in the payment system 200, and appropriate cryptographic material, to allow the WSP 208 to form a secure data communication connection with the consumer device server function 702 during execution of a payment transaction.

Execution of a payment transaction may require services of a number of resources within the payment-enabled mobile device 202, such as a file system 704. The file system may, for example, store files related to coupons, promotional vouchers, customer loyalty points, etc.

Other necessary or desirable resources may fall into the category of applications (block 706), and may include a wallet selection application 708, and an EMV payment application 710, among others. The wallet selection application 708, as will be seen, may function to allow the user 210 to select among payment card accounts (digitalized payment cards) housed in the user's digital wallet. The EMV payment application 710 may provide such functionality as producing a payment token for use in offline-only EMV POI terminals (for such transactions, the WSP would not be involved, and the authentication token provide—as described below—in consumer-device-server-function-to-WSP transactions would not be produced).

A database (block 712, FIG. 7) may also be supported in the payment-enabled mobile device 202 in association with one or more of the applications 706.

The consumer device server function 702 is uniquely identified in the payment system 200 through a unique URI, as referred to above. The URI is the root of a namespace tree, such as that depicted in FIG. 8.

Figure 8:
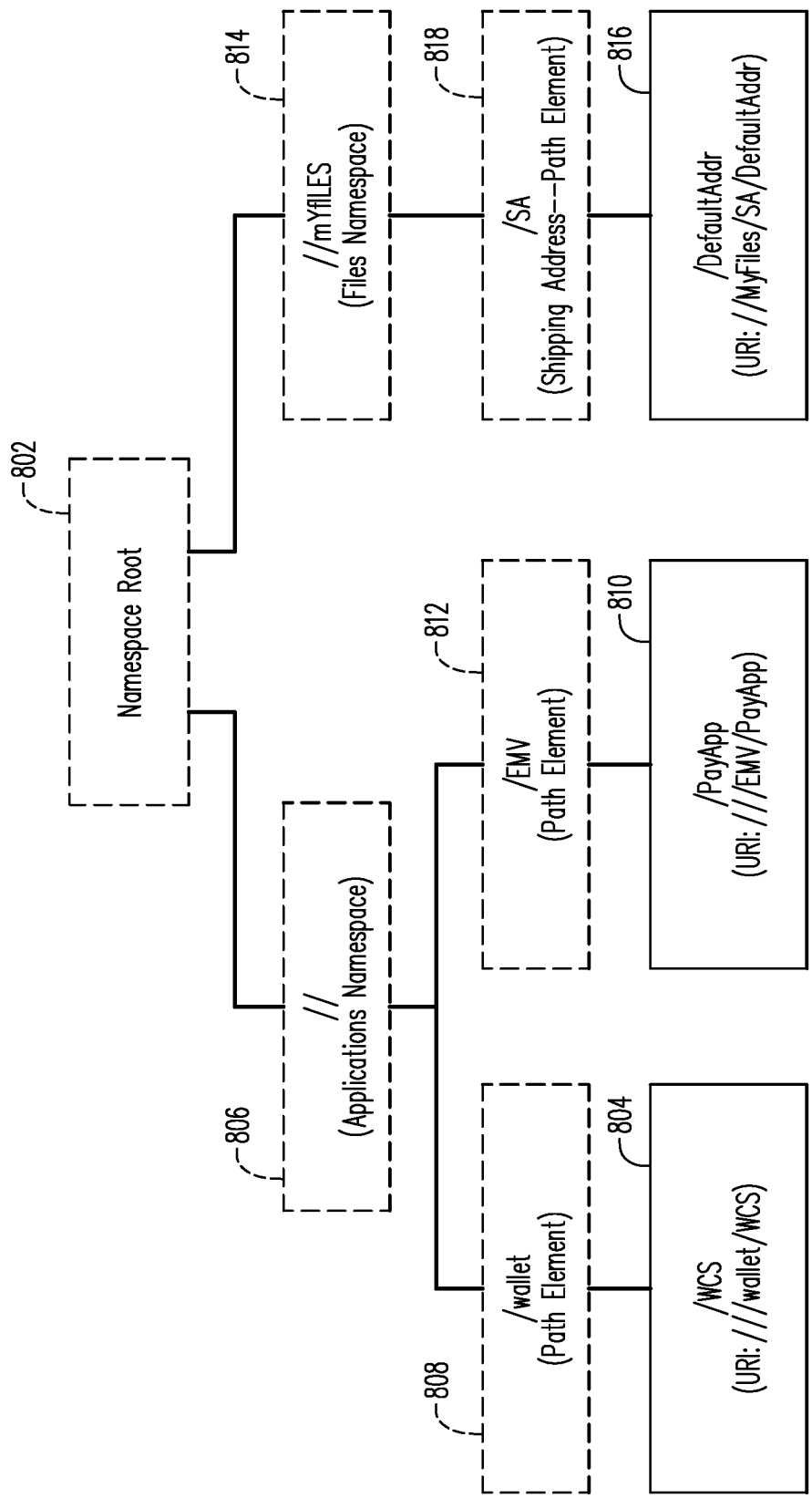
FIG. 8 illustrates additional details of software aspects of the payment-enabled mobile telephone of FIG. 3.

As seen in FIG. 8, the above-mentioned namespace root is represented by block 802. The wallet selection application referred to above is represented by block 804, and is reached through the tree via the applications namespace (block 806) and the wallet path element (block 808). Similarly, the above-mentioned EMV payment application is represented by block 810 in FIG. 8 and is reached through the tree via the applications namespace 806 and the EMV path element 812.

The tree illustrated in FIG. 8 also may include a files namespace (block 814). In one example embodiment, a default address leaf (block 816) is reachable via the files namespace 814 and a shipping address path element 818. The default shipping address may be modified by the user, and may be used to update the user's digital wallet at the WSP computer 208, with the wallet selection application sending the updated address to the WSP computer 208 in response to a call to the wallet selection application.

An HTTP web client (such as a client application hosted on the WSP computer 208) may interact with the consumer device server function 702 in the following manner, for example. The web client may ask the consumer device server function 702 for a service through an appropriate HTTP command. The command may encode several imbricated sub-commands that are targeted to resources accessible via the namespace tree. The consumer device server function 702 may dispatch the HTTP command based on the semantic of the command. The consumer device server function 702 may identify all imbricated sub-commands to be further directed to the appropriate resources, and then sequentially sends the identified sub-commands to each relevant resource.

While processing a sub-command, a resource may require an interaction with the user 210. For example, the resource (e.g., the wallet selection application) may need to receive input from the user 210 concerning the user's selection of a preferred card or set of cards to be used in a current payment transaction. As another example, the resource may require the user to perform a CVM (e.g., PIN entry or biometric) in order to produce proof that the user is not an impostor.

Each resource may elaborate its partial processing result corresponding to the set of sub-commands it executed and may return the partial processing result to the consumer device server function 702. The consumer device server function 702 may use the partial processing results received from the various resources to compose the HTTP response to be sent to the web client that made the HTTP command.

Figure 9:
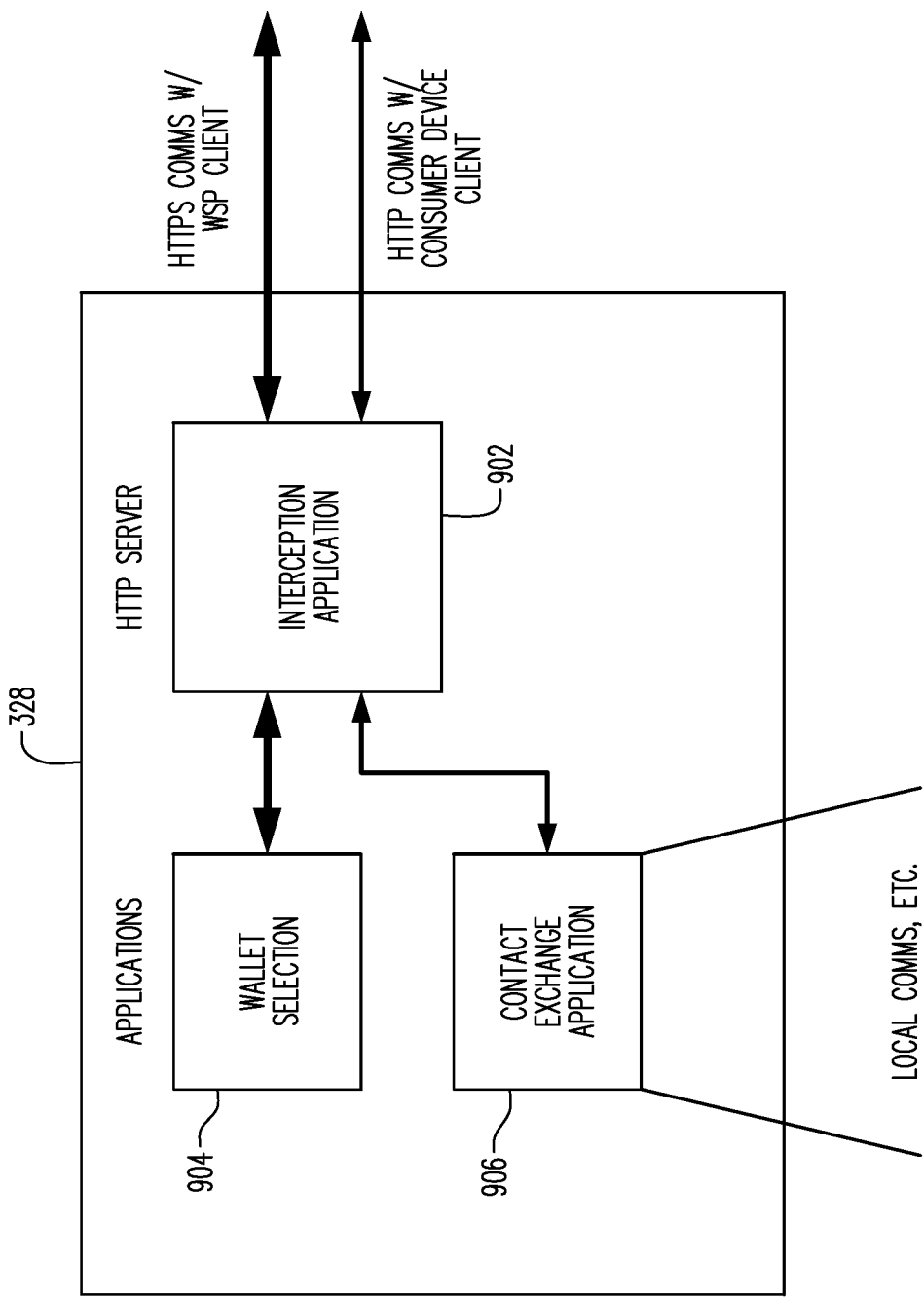
FIG. 9 illustrates still further details of software aspects of the payment-enabled mobile telephone of FIG. 3.

FIG. 9 illustrates still further details of software aspects of the payment-enabled mobile device 202 shown in FIGS. 2 and 3. In particular, FIG. 9 illustrates a basic software configuration that may be provided to implement an authentication token procedure in accordance with aspects of the present invention. (In addition to the software features illustrated in FIG. 9, the payment-enabled mobile device 202 may be further configured with additional software features to accommodate other functionality including possibly additional functionality described hereinbelow.)

The main software features shown in FIG. 9 are an interception application software program 902, a wallet selection application program 904, and a contact exchange application software program 906. The wallet selection application program 904 may coincide or overlap with the wallet selection application 708 referred to above in connection with FIG. 7. The interception application software program 902, the wallet selection application program 904 and the contact exchange application software program 906, may in some embodiments run on the secure element 328 (FIG. 3, also depicted in FIG. 9). There are other possible arrangements for providing an operating environment within the payment-enabled mobile device 202 for these software features, as will be understood from the above discussion of FIG. 3.

The interception application software program 902 may serve as a front end of the consumer device server function 702 referred to in connection with FIG. 7 and may provide the connection for the server function with the outside world, while dispatching sub-commands to internal software resources of the payment-enabled mobile device 202. For example, the interception application software program 902 may perform some or all of the following tasks, among others: (a) Establishing an HTTP communication session with an HTTP client (such as a client program running on the WSP computer 208, FIG. 5); and (b) determining what type of client is requesting service and applying appropriate access condition mechanisms to guarantee that each client is only permitted to ask for services to which it is entitled (the clients in question may include the WSP client—as just mentioned, a client program running on the payment-enabled mobile device 202, or another web client).

Moreover, if the HTTP client is the WSP computer 208, the interception application software program 902 may establish a secure communication tunnel with the WSP computer 208 by taken such actions as: (a) successful authentication of the WSP computer 208; (b) providing authenticable information to the WSP computer 208 to certify that the payment-enabled mobile device 202 and the consumer device server function 702 are eligible for participation in the payment system 200 and were issued/ enrolled by the operator of the WSP computer 208 (i.e., by the wallet service provider in question); and (c) establish secure communications with the WSP computer 208. The resulting communication session will provide encryption, data integrity and data origin authentication of all the data transferred between the payment-enabled mobile device 202 and the WSP computer 208. Various secure tunneling technologies can be used for this purpose, in accordance with the communication security aspects implemented in the payment-enabled mobile device 202 and the WSP computer 208.

Once a secure communication channel has been established between the WSP computer 208 and the consumer device server function 702, the client running in the WSP computer 208 can submit any type of HTTP request to the consumer device server function 702, with imbricated sub-commands to application resources within the payment-enabled mobile device 202.

Establishment of the secure communication channel between the WSP computer 208 and the consumer device server function 702 may involve use of a set of cryptographic keys previously loaded into the payment-enabled mobile device 202 during a personalization process performed by the WSP computer 208 with respect to the interception application software program 902.

In a case where the client making the request is one that runs on the payment-enabled mobile device 202 itself, the interception application software program 902 may filter the sub-commands submitted by the client to limit the client's request to actions such as selecting one or more payment card accounts and corresponding amounts to be charged to the accounts in accordance with options presented in a wallet selection form uploaded from the WSP client to the consumer device server function 702 for purposes of a current transaction. In this case the WSP computer 208 may consider the HTTP response from the consumer device server function 702 (i.e., conveying the wallet selection data as indicated by the user) if and only if such information is coming to the WSP computer 208 via the secure communication channel referred to above and established between the WSP client and the interception application software program 902. In this case, the communication of the wallet selection information, in a suitably secure manner, may be deemed an authentication token submitted for the transaction by the payment-enabled mobile device 202. It will be appreciated that the user's selection of wallet options as communicated via the authentication token may involve interaction between the user and the wallet selection application program 904.

Another action that the interception application software program 902 may permit a client on the payment-enabled mobile device 202 to perform may be a CVM for authentication of the user as the legitimate owner of the payment-enabled mobile device 202.

Still another action that the interception application software program 902 may permit a client on the payment-enabled mobile device 202 to perform may be selection of a communication technology (e.g., NFC, Bluetooth, Wi-Fi, QR code, SMS, USSD, etc.) as the mode of communication available between the payment-enabled mobile device 202 and the merchant POI terminal 204 (FIG. 2) for exchanging contact and transaction data between the payment-enabled mobile device 202 and the merchant POI terminal 204.

In some embodiments, the interception application software program 902 may function such that other clients (e.g., a client program running on the merchant POI terminal 204) may only send information to an application resource on the payment-enabled mobile device 202. For example, the interception application software program 902 may permit a client running on the merchant POI terminal 204 to send transaction detail data to the contact exchange application software program 906, without requesting processing, and the contact exchange application software program 906/ interception application software program 902 may return contact information for the payment-enabled mobile device 202, such as data that identifies the WSP for the user of the payment-enabled mobile device 202, and the URI for the consumer device server function 702 on the payment-enabled mobile device 202.

Turning now to the wallet selection application program 904, the latter may serve as a resource application that receives data communicated from the WSP computer 208 via the secure tunnel established between the interception application software program 902 and the WSP computer 208. This data may include data retrieved by the WSP computer 208 from the digital wallet it maintains for the user of the payment-enabled mobile device 202. This data may be referred to as "wallet form data", and may be such as is needed to allow the user to interact with a client running on the payment-enabled mobile device 202 to visualize his/her digital wallet as maintained on the WSP computer 208. With this data, the user is able to choose from his/her digital wallet a payment card account (or more than one such account) to be used for a current transaction. (I.e., it is contemplated that the user may pay for the entire transaction with one payment card account in his/her wallet, or alternatively he/she may split the transaction amount for funding by two or more of the payment card accounts represented in his/her digital wallet.)

Depending on the requirements set forth by the payment network (and/or the issuer) in question, the wallet selection application program 904 may require the user to perform a specific CVM. For example, the CVM may call for one or more of the following: (a) entry by the user of an overall wallet access password (not specific to a particular payment card account); (b) entry by the user of the PIN for a particular payment card account selected by the user for the current transaction; and/or (c) submission by the user of biometric input. (As just one example of the latter, where the transaction is to be funded wholly or in part from a social benefits (e.g., a government pension/social security scheme) account, the required CVM may include submission of a biometric that provides "proof of life"—one example of such a biometric would be a spoken utterance by the user to be processed for voice recognition; subsequent discussion herein will describe some examples of voice-recognition-based CVMs that may be provided in accordance with aspects of the present invention.)

The discussion will now turn to the contact exchange application software program 906. The contact exchange application software program 906 may also be a resource application on the payment-enabled mobile device 202 and may serve to permit the user to exchange data with the merchant POI terminal 204. For example, the contact exchange application software program 906 may supply to the merchant POI terminal 204 address data that identifies the (or a) WSP for the user. In some embodiments, this address data may simply be an identifier by which the WSP is recognized or designated in the payment system 200. In addition, the contact exchange application software program 906 may supply to the merchant POI terminal 204 address data for the payment-enabled mobile device 202, such as the above-mentioned URI which serves as an internet address for the consumer device server function 702 (which may ultimately be passed on to the WSP computer 208, via the merchant POI terminal 204 and the PSP/acquirer computer 206).

In terms of data communicated in the other direction, i.e., from the merchant POI terminal 204 to the contact exchange application software program 906, the latter data may include data concerning the present transaction (which may be denoted as "transaction detail data" and which may include the transaction amount, for example), and also may include data concerning the context ("transaction context data"), such as data related to identification of the merchant, the merchant location, and/or the particular merchant POI terminal 204 in question.

To enable the communication between the contact exchange application software program 906 and the merchant POI terminal 204 it may be necessary for there to be agreement on a mode of peer-to-peer communication by which the data is to be exchanged. In some embodiments, the mode of communication may be selected by the user, who may provide input into the payment-enabled mobile device 202 to select, e.g., one of a list of communication modes displayed on the merchant POI terminal 204 as visual icons that are viewable by the user. For example, the communication options may include one or more of NFC, Bluetooth, WiFi, QR code and/or USSD.

As noted before, and among a number of possibilities, the consumer device server function 702 may be configured to operate in accordance with GPNF, as promulgated by GlobalPlatform, and/or in accordance with the SCWS (Smart Card Web Server) standard published by OMA. Also as noted above, hardware options for the payment-enabled mobile device 202 may include a generally conventional smartphone, e.g., with the consumer device server function 702 running on an IC card installed in the smartphone.

Figure 10:
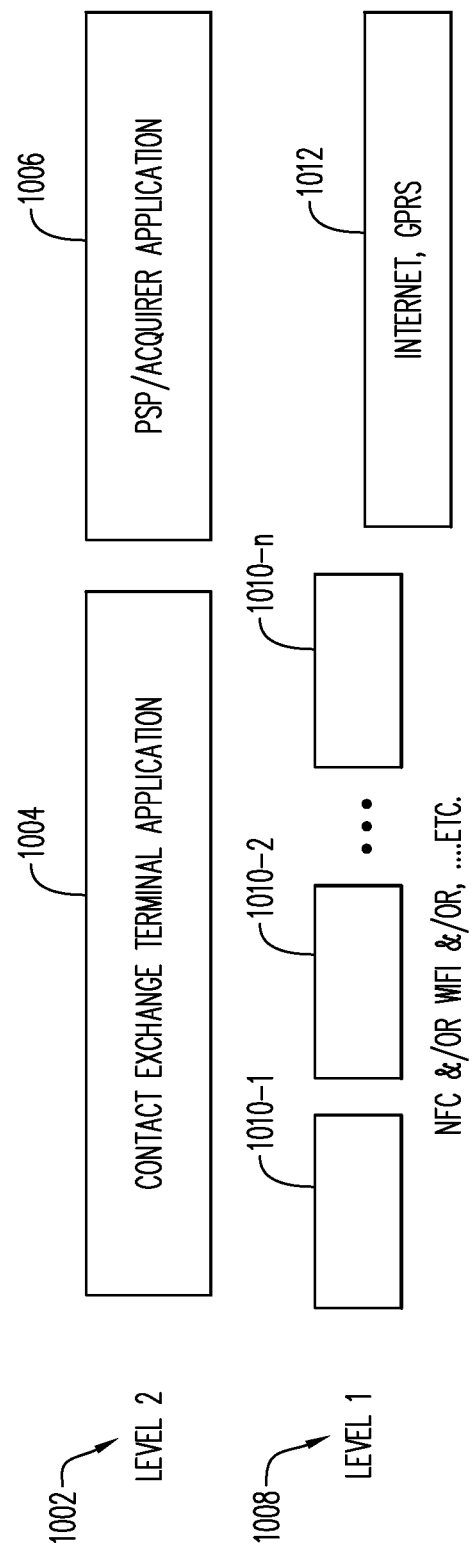
FIG. 10 schematically illustrates software aspects of the POS terminal of FIG. 4.

FIG. 10 schematically illustrates software aspects of the merchant POI terminal 204 (FIGS. 2 and 4). As can be gathered from FIG. 2, the merchant POI terminal 204 may serve as the device that represents the merchant in a particular purchase transaction, and interacts on one hand with the payment-enabled mobile device 202 and on the other hand with the PSP/acquirer computer 206.

At a higher level of the software in the merchant POI terminal 204 (reference numeral 1002 in FIG. 10), a contact exchange terminal application 1004 is provided to interact with the payment-enabled mobile device 202, and a PSP/acquirer application 1006 is provided to interact with the PSP/acquirer computer 206.

Relative to the contact exchange terminal application 1004 and the interaction with the payment-enabled mobile device 202, the contact exchange terminal application 1004 may establish a handshake with the contact exchange application software program 906 in the payment-enabled mobile device 202 to allow the following data exchange: (a) (from merchant POI terminal 204 to payment-enabled mobile device 202) transmission of the transaction detail data for the current transaction and the transaction context (merchant context) data for the current transaction; and (b) (from payment-enabled mobile device 202 to merchant POI terminal 204) transmission of the URI for the consumer device server function 702 and the identifier for the user's WSP.

Relative to the PSP/acquirer application 1006 and the interaction with the PSP/acquirer computer 206, the PSP/acquirer application 1006 may establish an internet connection with the PSP/acquirer computer 206 using, for example, TLS (transport layer security) tunneling via the internet to enable the following exchanges of data: (a) (from merchant POI terminal 204 to PSP/acquirer computer 206) the PSP/acquirer application 1006 transmits the contact details for the payment-enabled mobile device 202 (i.e., WSP identifier and URI for the consumer device server function 702) and the same transaction detail data and transaction context data that the contact exchange terminal application 1004 provided to the contact exchange application software program 906; and (b) (from PSP/acquirer computer 206 to merchant POI terminal 204; after interaction between the PSP/acquirer computer 206 and the WSP computer 208) the PSP/acquirer application 1006 running in the merchant POI terminal 204 receives a transaction result (e.g., approve/decline), to indicate that the purchase transaction may be completed.

At a lower level of the software in the merchant POI terminal 204 (reference numeral 1008 in FIG. 10) communication protocol software may be provided, including communication protocol software elements 1010-1 through 1010-n for communicating with the payment-enabled mobile device 202, and an internet/GPRS (General Packet Radio Service) communication protocol software element 1012. Communications via the latter may in some embodiments eventually pass through a WiFi connection. The communication protocol software element 1012 may provide at least part of the communication link between the merchant POI terminal 204 and the PSP/acquirer computer 206.

Figure 11A:
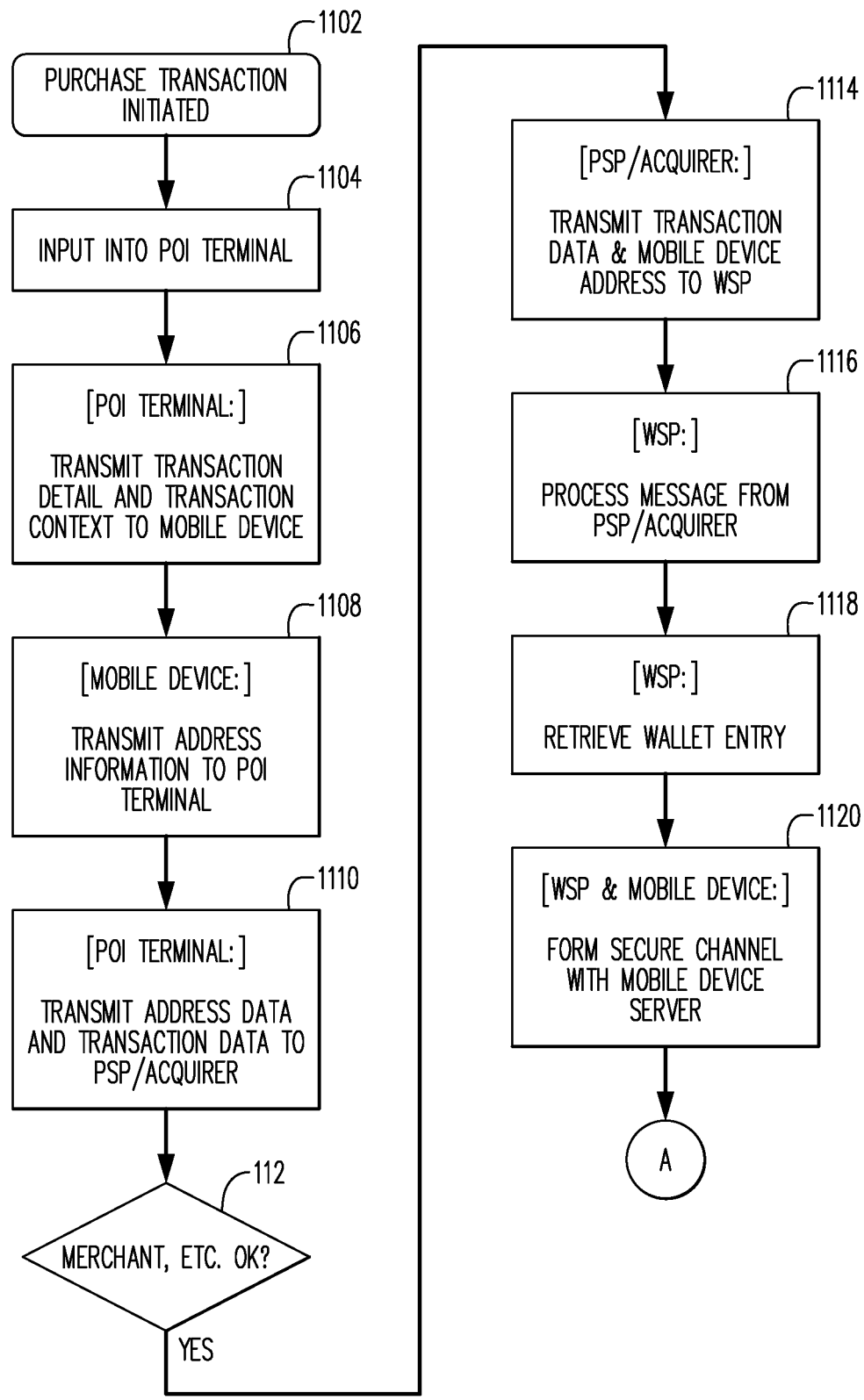
FIGS. 11A and 11B together form a flow chart that illustrates a transaction process that may be performed in the system of FIG. 2 in accordance with aspects of the present invention.
Figure 11B:
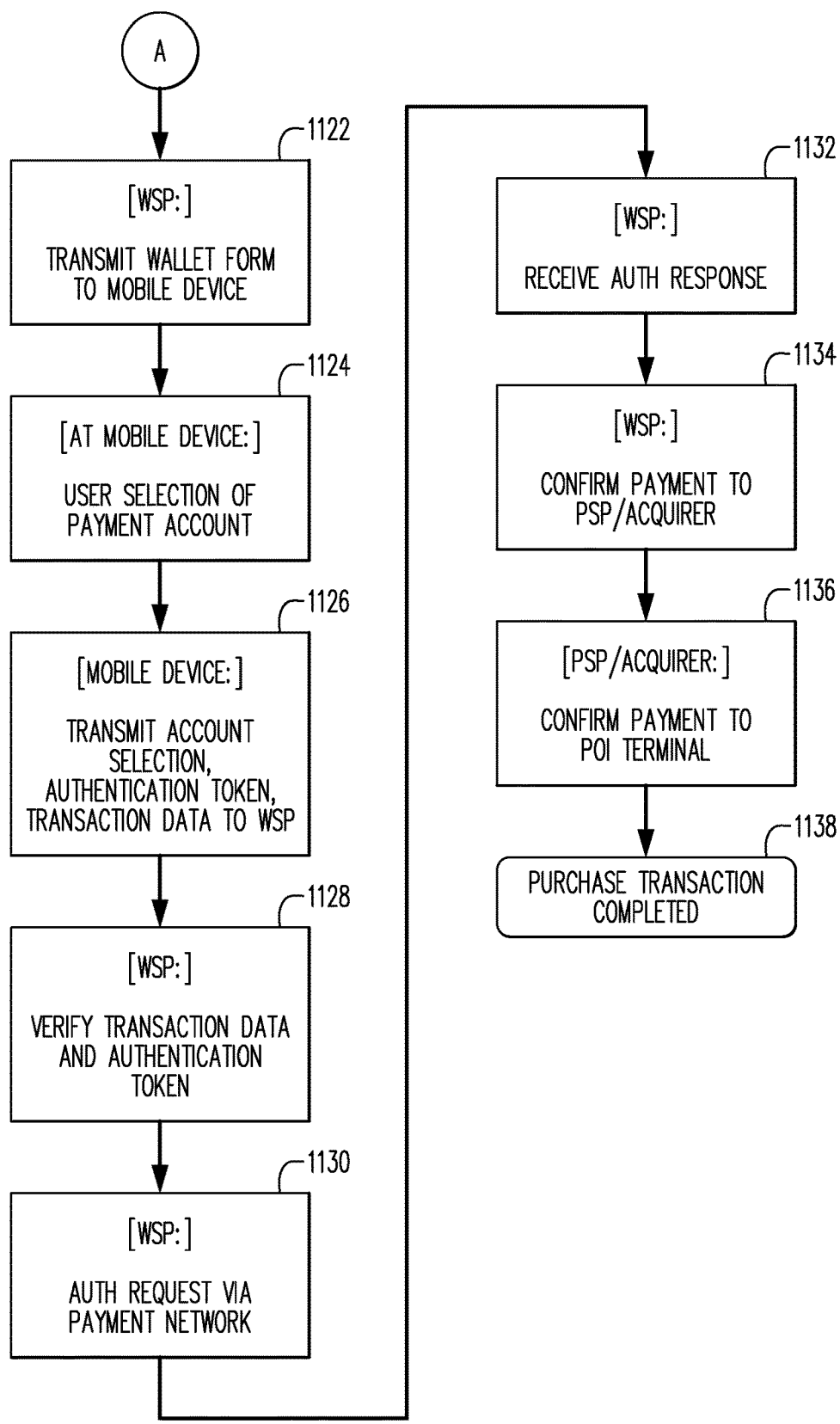

FIGS. 11A and 11B together form a flow chart that illustrates a transaction process that may be performed in the payment system 200 (FIG. 2) in accordance with aspects of the present invention.

At block 1102 in FIG. 11A, a purchase transaction is initiated. For example, in the context of a brick-and-mortar retail store, a customer (user 210 of the payment-enabled mobile device 202) may select merchandise and present it for purchase at a point-of-sale counter. (As will be understood from a later section of this disclosure, the process of FIGS. 11A and 11B is also generally applicable to the environment of an e-commerce transaction.)

At 1104 in FIG. 11A, transaction data is input into the merchant POI terminal 204, which may be located at the point-of-sale counter. This may occur, for example, by the merchant sales associate operating the merchant POI terminal 204 by, e.g., scanning barcodes on the merchandise to allow input to the merchant POI terminal 204 of the identifiers of the merchandise items and also to allow for lookup by the merchant POI terminal 204 of price information for the merchandise items. As a result of this operation, the merchant POI terminal 204 may calculate a total amount for the purchase transaction (transaction amount). In addition, the merchant POI terminal 204 may generate other transaction data including, for example, a data element that indicates what currency the transaction amount is denominated in, as well as the date of the transaction.

At 1106, the merchant POI terminal 204 may transmit the transaction detail data (e.g., amount, currency, date, etc.) to the payment-enabled mobile device 202, and at the same time the merchant POI terminal 204 may transmit transaction context data to the payment-enabled mobile device 202. For example, the transaction context data may include a merchant identifier and location (which may be parameters stored in the merchant POI terminal 204). In addition, the transaction context data may include a unique transaction number (UTN). In some embodiments, the merchant POI terminal 204 may generate a fresh UTN for each transaction it handles. For example, the merchant POI terminal 204 may calculate the UTN as a hash of such information as the merchant identifier, the transaction location, a transaction counter value, and possibly other information as well. The merchant POI terminal 204 may operate to increment the transaction counter value with each transaction that occurs at the merchant POI terminal 204.

At 1108, the payment-enabled mobile device 202 may transmit data to the merchant POI terminal 204 to permit the payment-enabled mobile device 202 to be contacted for a subsequent stage (token passing) of the transaction process. As mentioned before, the data transmitted from the payment-enabled mobile device 202 to the merchant POI terminal 204 may be address data, in particular: (a) the identifier for the WSP that stores the digital wallet for the user (or at least one of the user's digital wallets), and (b) the URI for the consumer device server function 702 hosted in the payment-enabled mobile device 202. (It is worth noting at this point that in some embodiments of the invention and of the payment-enabled mobile device 202, the user may be prompted to select a WSP and/or a digital wallet from among a plurality of his/her WSPs/digital wallets before step 1108 occurs and/or the user may make such a selection without being prompted and perhaps while approaching the point-of-sale counter. It is within the contemplation of aspects of this invention that the payment-enabled mobile device 202 may run a WSP-selection app or the like for this purpose.)

It should also be noted that the communication channel 216 (FIG. 2) between the payment-enabled mobile device 202 and the merchant POI terminal 204 need not be highly secure, as no highly sensitive data such as a PAN (primary account number) is being exchanged between the two devices.

At 1110 in FIG. 11A, the merchant POI terminal 204 may transmit data to the PSP/acquirer computer 206. This may occur over communication channel 218 (FIG. 2), which may be implemented over a wide-area network such as the internet or GPRS. The communication channel 218 may be secured by an appropriate measure, such as TSL. The data transmitted at 1110 may include the address data that the merchant POI terminal 204 received from the payment-enabled mobile device 202 at 1108, and transaction data such as the transaction details, the transaction context and the current transaction counter value.

Following block 1110 in FIG. 11A is decision block 1112. In some embodiments, the determination represented by decision block 1112 may be made by and at the PSP/acquirer computer 206. For example, the merchant POI terminal 204 may check that the merchant is duly eligible to participate in the payment system 200 in the manner requested by the merchant POI terminal 204. This may involve the PSP/acquirer computer 206 searching for the merchant identifier (included in the transaction context data) in one or more merchant subscription tables. If the PSP/acquirer computer 206 determines that the merchant is eligible to request the transaction, then the PSP/acquirer computer 206 may proceed with further checks, such as checking that the transaction counter is fresh and that the UTN is valid relative to the merchant.

In addition, the PSP/acquirer computer 206 may check the identification of the WSP to confirm that the WSP is validly enrolled in the payment system 200. This may occur in a manner that is analogous to a conventional operation in which an acquirer may confirm the validity of a payment network for which a PAN-based authorization request is to be submitted.

Assuming that the checks all result in satisfactory findings, block 1114 may follow decision block 1112 in the process of FIGS. 11A and 11B. At block 1114, the PSP/acquirer computer 206 may transmit data to the WSP computer 208. As part of this operation, the PSP/acquirer computer 206 may use the identifier of the WSP as received from the merchant POI terminal 204 to determine that it should establish a secure communication channel (channel 220 in FIG. 2) with the appropriate WSP. This may be done over the internet, for example, with TSL. The data transmitted at 1114 may include all the data received by the PSP/acquirer computer 206 at 1110, except possibly excluding the transaction counter value provided by the merchant POI terminal 204. It will be noted that, according to aspects of this invention, this data will typically include the URI for the consumer device server function 702 hosted on the payment-enabled mobile device 202.

Block 1116 follows block 1114. At block 1116, the WSP computer 208 receives and processes the data transmitted by the PSP/acquirer computer 206. In particular, the WSP computer 208 may generate a transaction identifier, which may for example be formed from the merchant identifier (corresponding to the merchant that operates the merchant POI terminal 204) plus the UTN provided in the message received by the WSP computer 208 from the PSP/acquirer computer 206. Further as part of the operation of block 1116, the WSP computer 208 may store the transaction data (transaction detail data and transaction context data), as received from the PSP/acquirer computer 206, in association with the transaction identifier generated by the WSP computer 208. Still further as part of the operation of block 1116, the WSP computer 208 may read, from the data supplied by the PSP/acquirer computer 206, the URI for the consumer device server function 702 hosted in the payment-enabled mobile device 202. Next, the WSP computer 208 may verify that the URI in question is not blacklisted and that the user in question has a valid subscription to the wallet services provided by the WSP that operates the WSP computer 208.

Block 1118 follows block 1116. At block 1118, the WSP computer 208 goes on to retrieve the wallet entry for the user of the payment-enabled mobile device 202, as identified by the above-mentioned URI. With the data from the user's wallet entry (i.e., the user's digital wallet maintained by the WSP computer 208), the WSP computer 208 forms wallet form data to be sent to the consumer device server function 702 hosted in the payment-enabled mobile device 202. The wallet form data will present information to the user to permit him/her to choose among the payment card accounts in his/her digital wallet to select the account(s) to be used for the current transaction. If the user wishes to use more than one of his/her accounts and to distribute the transaction amount among the selected accounts, the wallet form data may allow the user to indicate his/her choices in this regard as well.

Block 1120 follows block 1118. At block 1120, the WSP computer 208 uses the URI for the consumer device server function 702 hosted in the payment-enabled mobile device 202 to initiate formation of a secure communication channel (channel 222 in FIG. 2) between the WSP computer 208 and the consumer device server function 702 hosted in the payment-enabled mobile device 202. For example, a so-called secure tunneling technology may be employed, such as one of the published protocols known as "SCP" (secure channel protocol). The consumer device server function 702 hosted in the payment-enabled mobile device 202 (and particularly, the interception application software program 902) cooperates with the WSP computer 208 in exchanging information necessary for the WSP computer 208 and the consumer device server function 702 hosted in the payment-enabled mobile device 202 to mutually authenticate each other. With the successful formation of the secure communication channel 222, it is established that the WSP computer 208 and the consumer device server function 702 hosted in the payment-enabled mobile device 202 have mutually authenticated each other, and enciphering of communications in both directions through the channel 222 is enabled.

Referring again to the flowchart of FIGS. 11A-11B, and particularly to FIG. 11B, block 1122 follows block 1120. At block 1122, the WSP computer 208 transmits the above-referenced wallet form data to the payment-enabled mobile device 202 (i.e., to the consumer device server function 702). Then block 1124 follows block 1122. At 1124, the payment-enabled mobile device 202 (particularly the interception application software program 902) decrypts the wallet form data and submits the information contained in the wallet form data to the user via the wallet selection application program 904. Using the interface provided to him/her via the payment-enabled mobile device 202, the user 210 selects the account(s) for the current transaction, and if necessary the respective amounts for funding by each account, if more than one account is selected. The resulting account selection data is provided within the payment-enabled mobile device 202 to the interception application software program 902. (It may be the case that, in connection with the user's interaction with the wallet selection application program 904, the user may be required to properly complete a CVM process, such as those referred to above. For example, PIN entry and/or submission of biometric input may be required. In some embodiments, the resulting data ultimately is passed along to the WSP computer 208 for verification.)

Block 1126 follows block 1124. As part of the operation of block 1126, the interception application software program 902 generates an authentication token for the transaction. The interception application software program 902 may generate the authentication token as a Message Authentication Code (MAC) on the basis of the account selection data, and the transaction data (transaction detail data and transaction context data) that the payment-enabled mobile device 202 had received at block 1106 (FIG. 11A) from the merchant POI terminal 204. Also as part of the operation of block 1126, the interception application software program 902 may generate a transaction identifier, which may contain the merchant identifier for the transaction plus the UTN generated for the transaction by the merchant POI terminal 204 and transmitted to the payment-enabled mobile device 202 at block 1106. The interception application software program 902 (and hence the payment-enabled mobile device 202) may then transmit the following data to the WSP computer 208: (a) the account selection data, as indicated by the user 210 at 1124; (b) the transaction identifier, and (c) the authentication token. It should be noted that although the payment-enabled mobile device 202 may not transmit the transaction data (i.e., the transaction detail data and the transaction context data) in their complete form to the WSP computer 208, nevertheless, because the authentication token is based on the transaction data (with other data elements), the authentication token may be considered a verifiable copy of the transaction data.

Continuing to refer to FIG. 11B, block 1128 follows block 1126. At block 1128, the WSP computer 208 receives the data transmitted from the payment-enabled mobile device 202 (i.e., from the interception application software program 902/consumer device server function 702). Using the transaction identifier provided by the payment-enabled mobile device 202, the WSP computer 208 matches the data received from the payment-enabled mobile device 202 with the data it had stored for the transaction in association with the transaction identifier as generated by the WSP computer 208 at block 1116. The WSP computer 208 identifies the transaction detail data and the transaction context data that it had previously stored (after receiving same from the PSP/acquirer computer 206 at 1116) and proceeds to verify the authentication token as provided by the consumer device server function 702 hosted in the payment-enabled mobile device 202. In doing so, the WSP computer 208 in effect confirms that the transaction detail data and the transaction context data as reflected in the authentication token match the transaction detail data and the transaction context data as received by the WSP computer 208 from the PSP/acquirer computer 206. Verification of the authentication token by the WSP computer 208 indicates to the WSP computer 208 that the account selection data from the payment-enabled mobile device 202 is valid and has the effect of a payment order to be executed by the WSP computer 208.

Block 1130 follows block 1128. It will initially be assumed for the purpose of describing block 1130 that the user 210 had selected only one payment card account from his/her digital wallet to fund the current transaction. Accordingly, at 1130 the WSP computer 208, acting substantially like a conventional acquirer, uses the PAN for the user-selected payment card account (as stored in and retrieved from the user's digital wallet) to route a payment network authorization request via the indicated payment network (assumed to be the payment network 110 shown in FIG. 2) to the issuer of the user-selected payment card account (assumed to be the issuer 112 shown in FIG. 2).

Now, for an alternate description of block 1130, it will be assumed that the user selected more than one payment card account from his/her digital wallet, for distribution of the transaction amount among the selected payment card accounts. In this case, the account selection data provided by the payment-enabled mobile device 202 to the WSP computer 208 may include two or more lines, with each line corresponding to a respective user-selected account and with each line indicating the portion of the transaction amount to be charged to the respective account. For each such account, the WSP computer 208 may issue a respective authorization request via the appropriate payment network (i.e, more than one payment network may be involved in the current transaction, although only one payment network is depicted in FIG. 2) for routing to the respective issuer for the account.

Continuing to refer to FIG. 11B, block 1132 follows block 1130. At block 1132, the WSP computer 208 receives a substantially conventional authorization response message, which originated from the issuer 112 and which was routed to the WSP computer 208 via the payment network. It will next be assumed that the authorization response indicates approval by the issuer of the authorization request initiated by the WSP computer 208 (or, if more than one payment card account had been selected by the user, it is assumed that all of the authorization responses from the issuers indicate approval), in which case, block 1134 follows block 1132.

At block 1134, the WSP computer 208 transmits an acknowledgment message to the PSP/acquirer computer 206 to confirm that payment has been duly made for the current transaction. Block 1136 then follows. At block 1136, the PSP/acquirer computer 206 transmits an acknowledgment message to the merchant POI terminal 204 to confirm that payment has duly been made for the current transaction. Block 1138 then follows, at which the purchase transaction at the retail store is completed. For example, the merchant POI terminal 204 may display to the merchant's sales associate an indication that payment has been acknowledged/confirmed, and may print a suitable receipt for the customer/mobile device user 210. The customer may then leave the retail store with the purchased merchandise and the receipt.

The payment system 200, as described herein, may provide enhanced security for sensitive information such as payment card account PANs as compared to conventional payment systems in which the merchant reads the PAN from a card or other device at the point of purchase. In the payment system 200, the merchant never has possession of the customer's PAN; accordingly, a mass data breach at the merchant level, with attendant difficulties and potential exposure to fraud, may be highly unlikely or impossible with the payment system 200.

Moreover, because the PAN and related data do not pass through the POS terminal (also referred to as the POI terminal) in the payment system 200, the cost of the POS terminal may be substantially reduced as compared to conventional POS equipment currently in use. For example, in the POI terminal as described herein, there may be no need for the type of complex cryptographic calculations that are employed in some conventional POS equipment. Accordingly the POI terminal as described herein may be simplified in that it may not need to have either a fast main processor and/or a specialized cryptographic processor, such as may be included in conventional POS equipment. Moreover, with this arrangement PCI compliance may not be required for the POI terminal. There may also be savings with respect to the software that programs the POI terminal as described herein in that the software itself may be less complex than conventional POS equipment software, and may be subject to less complex certification processes than are conventionally employed in many cases for POS equipment software.

Further, in other hardware respects the POI terminal described herein may be simplified, in that there may be no need for such components as a secure keyboard, a secure biometric sensor or a secure display device. In general, tampering detection and tampering reaction mechanisms may not be needed in the POI terminal described herein, because the POI terminal no longer handles payment application processes, but rather is a protocol adapter for exchanging basic information between the customer and the merchant, while also relaying basic information from the consumer device server function 702 hosted in the payment-enabled mobile device 202 to the PSP/acquirer and on to the WSP.

It is another advantage of the payment system 200 that, in contrast to other payment token systems that have been proposed, there are potentially an unlimited number of authentication tokens available as the same have been described in this disclosure.

Still further, since the payment-enabled mobile device 202 provides a representation of transaction data to the WSP computer 208, for comparison by the WSP computer 208 with the transaction data received from the merchant POI terminal 204 via the PSP/acquirer computer 206, there is enhanced protection against fraudulent unsolicited transactions.

In the above discussion of the embodiment shown in FIG. 2 and subsequent drawings, it has been assumed that the merchant POI terminal 204 was located at the point of sale in a brick-and-mortar retail store. However, in other embodiments of the payment system 200, the merchant POI terminal 204 may for example be constituted by an e-commerce server operated by a merchant to handle online purchase transactions. In such embodiments, the customer may access the merchant POI terminal 204 initially in a conventional manner (e.g., via a browser running on a personal computer), or alternatively may use a mobile device browser running on his/her smartphone/mobile device (which may also be the above-described payment-enabled mobile device 202). In any case, for the payment portion of the transaction, the merchant POI terminal 204 and the payment-enabled mobile device 202 may exchange such information as is described above in connection with blocks 1106 and 1108. This may occur, for example, via such communication modes as SMS (short message service) or USSD (unstructured supplementary service data). The exchange of this information may alternatively be conducted via HTTP communications, with the mobile device 202 acting as a client and connecting to the merchant's website via its browser. For these purposes the payment-enabled mobile device 202 may exchange communications with the merchant POI terminal 204 via a mobile communications network (not shown) for which the payment-enabled mobile device 202 is a subscriber device. In other ways, for this case of the merchant POI terminal 204 as an e-commerce server, the process as described above in connection with FIGS. 11A/11B may be quite similar.

Referring again to the case where the purchase transaction occurs face-to-face, the merchant POI terminal 204 and the payment-enabled mobile device 202 may be able to interact directly via a bidirectional exchange. To establish the bidirectional exchange, the merchant POI terminal 204 and the payment-enabled mobile device 202, acting as peer devices, may perform an automatic setup of a bidirectional channel between the two devices. This could occur in a number of ways, depending on the features present in the devices. For example, this could be done directly through an NFC peer-to-peer data exchange. This may be an advantageous approach in that it takes advantage of existing smartphone capabilities.

However, in other embodiments, or if additional features require a larger volume of data to be exchanged, the bidirectional communication could occur through a process where the devices cooperate via NFC to transfer over to another technology such as Bluetooth or WiFi.

As another alternative, and as suggested above (and in either a face-to-face or remote transaction situation), the merchant POI terminal 204 and the payment-enabled mobile device 202 may interact outside a communication channel. For example, via USSD or SMS, the payment-enabled mobile device 202 may submit the information referred to in connection with block 1108 to a phone number visually displayed on the merchant POI terminal 204. As another possibility, the payment-enabled mobile device 202 (assuming it includes a camera, as many smartphones do), may capture an image of a QR code (quick response code) as displayed by the merchant POI terminal 204 (or downloaded from the merchant, in the case where the merchant POI terminal 204 is an e-commerce server).

In the embodiment shown in FIG. 2, the PSP/acquirer computer 206 functions essentially as a switch between merchant devices and WSPs. It is contemplated that some embodiments may omit the PSP/acquirer computer 206 in favor of a direct communication link between the merchant POI terminal 204 and the WSP computer 208. However, it may be advantageous to have acquirers as a layer between merchants and WSPs to aid in managing the workload for the WSPs and to enhance scalability of the payment system 200. It may also aid in fast and efficient conflict resolution and chargebacks to have acquirers present in the payment system 200 between merchants and WSPs.

Figure 12:
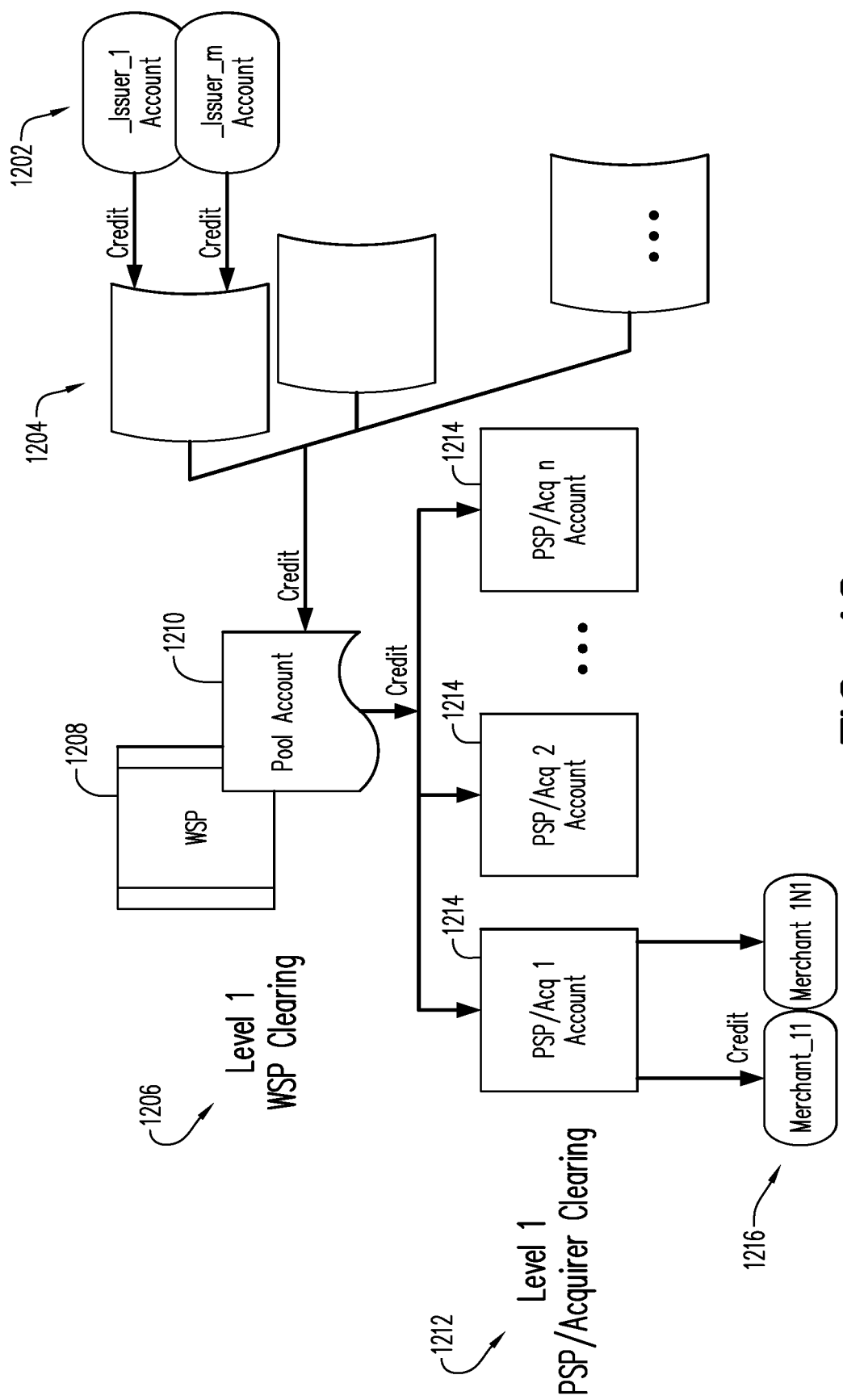
FIG. 12 schematically illustrates a clearing process that may be performed in the system of FIG. 2 in accordance with aspects of the present invention.

FIG. 12 schematically illustrates a clearing process that may be performed in the system 200 of FIG. 2 in accordance with aspects of the present invention.

In FIG. 12, payment card issuers' settlement accounts are indicated at 1202. The settlement accounts of payment networks are indicated at 1204. (Although only one payment network account 1204 is shown as having payment card issuers' accounts feeding into it, in practice, as will be appreciated, the same will be true of all of the payment network settlement accounts.)

A first level of the clearing process is indicated at 1206, and features a WSP 1208, having a WSP pool account 1210. A second level of the clearing process is indicated at 1212, and features settlement accounts 1214 belonging to PSPs/acquirers.

Also shown in FIG. 12 are merchant settlement accounts 1216. (To simplify the drawing, only one of the PSP/acquirer settlement accounts 1214 is shown feeding merchant settlement accounts 1216; however it will be understood that in practice all the PSP/acquirer settlement accounts 1214 would do the same.)

One of the payment card issuer settlement accounts 1202 may be associated with the issuer 112 shown in FIG. 2. One of the payment network settlement accounts 1204 may be associated with the payment network 110 shown in FIG. 2. The WSP 1208 shown in FIG. 12 may be the operator of the WSP computer 208 shown in FIG. 2. One of the PSP/acquirer settlement accounts 1214 shown in FIG. 12 may be associated with the operator of the PSP/acquirer computer 206 shown in FIG. 2. One of the merchant settlement accounts 1216 shown in FIG. 12 may be associated with the merchant that operates the merchant POI terminal 204 shown in FIG. 2.

It will be understood that two or more different payment networks are represented in the payment network settlement accounts 1204 shown in FIG. 12, whereas those two or more different payment networks are also participants in the payment system 200 (notwithstanding that only one payment network is explicitly shown in FIG. 2).

Block 1210 shown in FIG. 12, in addition to representing the WSP pool account, should also be understood to represent a computer that manages the flow of clearing credits into and out of the pool account. That computer may be operated by a financial institution, by the WSP, or by another entity and may for example be the WSP computer 208 of FIG. 5.

At the first level 1206 of the clearing process, the WSP 1208 has a role like a "mega" acquirer, and each PSP/acquirer represented in FIG. 12 has a role like a "mega" merchant. The clearing between the WSP 1208 and the payment card issuers occurs in the same manner as conventional clearing between an acquirer and issuers through a payment network. The WSP 1208 manages the pool account 1210 to receive clearing credits from the payment network settlement accounts 1204, where the clearing credits originated from payment card accounts issued by the payment card issuers represented in FIG. 12. Moreover, the WSP 1208 manages the pool account 1210 to distribute the clearing credits among the PSP/acquirer settlement accounts 1214.

At the second level 1212 of the clearing process, each acquirer manages its respective settlement account 1214 to clear credits due to its subscriber merchants. In particular, each of the PSP/acquirer settlement accounts 1214 receives clearing credits from the WSP pool account 1210, and those credits are further distributed to the merchant accounts 1216.

The layered clearing process as illustrated in FIG. 12 may aid in enhancing the scalability of the payment system 200. FIG. 12 also illustrates how funds flow among participants in the acquiring process with appropriate service fees accruing.

Figure 13:
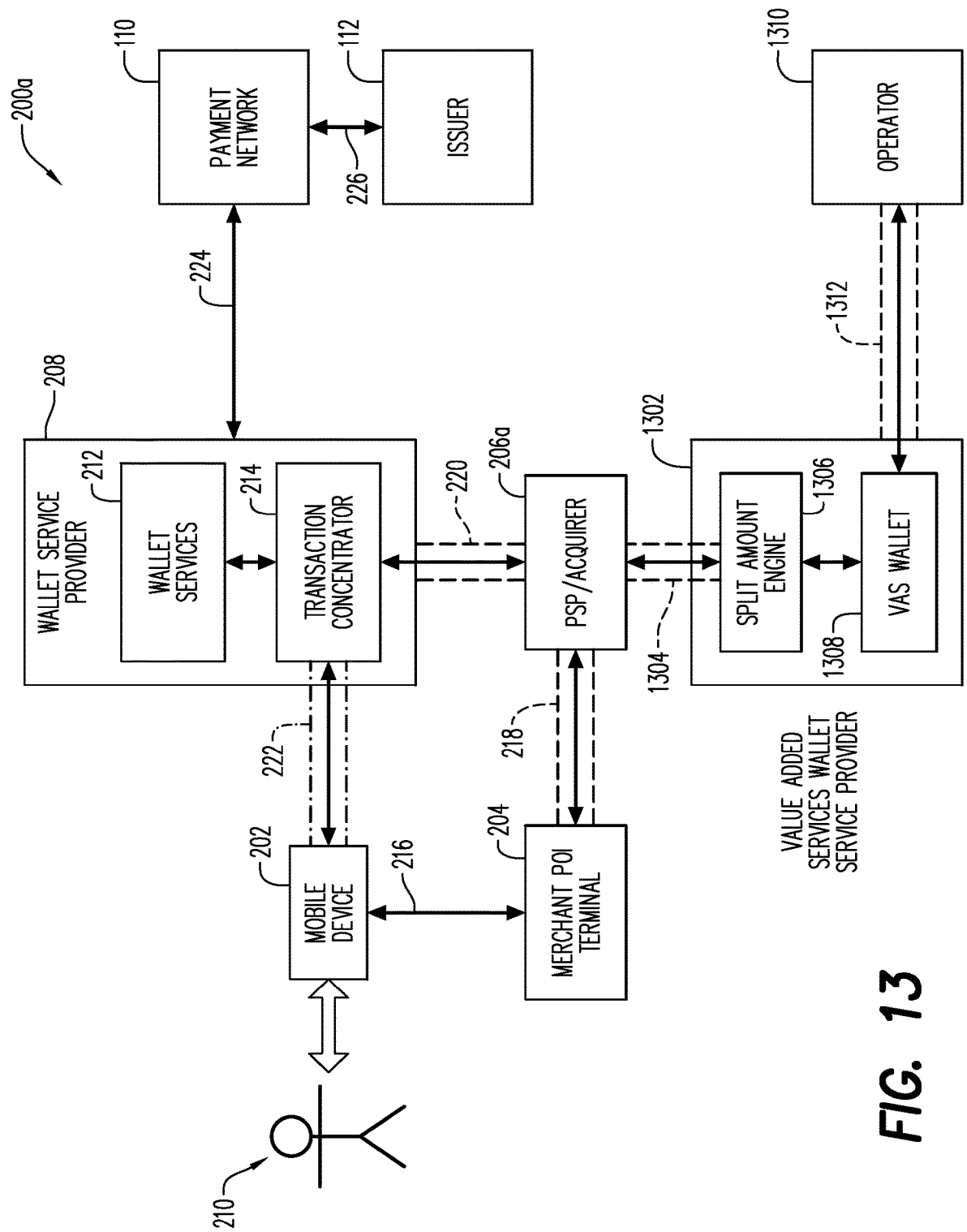
FIG. 13 is a block diagram that illustrates an alternative embodiment of the payment system of FIG. 2.

FIG. 13 is a block diagram that illustrates an alternative embodiment (generally indicated by reference numeral 200a in FIG. 13) of the payment system of FIG. 2.

The payment system 200a shown in FIG. 13 may include essentially all of the components of the payment system 200 as described in connection with FIG. 2 and subsequent drawings. In addition, the payment system may include a value added services (VAS) WSP computer 1302 that is connected (at least from time to time) to an PSP/acquirer computer 206a via a communication channel 1304. (The PSP/acquirer computer 206a shown in FIG. 13 may include all of the functionality of the PSP/acquirer computer 206 shown in FIG. 2 and as described above, and in addition may perform additional switching and/or other functions to accommodate value added services/split payment functionality in the payment system 200a of FIG. 13.) The VAS WSP computer 1302 may maintain for the user 210 (and many other users as well) one or more digital wallets by which the user 210 may access and select funding from benefit accounts (i.e., not from payment card accounts). The benefits accessible via the user's digital wallet at VAS WSP computer 1302 may include one or more of the following: (a) coupons, (b) loyalty/rewards points, (c) medical insurance benefits, (d) pension and/or social insurance and/or social welfare benefits, (e) casualty insurance benefits, etc.

FIG. 13 also shows two main functional blocks of the VAS WSP computer 1302, namely a split amount engine 1306 and a VAS wallet services component 1308. The split amount engine 1306 may perform logic required to split payment in the payment system 200a between benefit funding and payment card account funding. The VAS wallet services component 1308 may maintain the VAS/benefit funds digital wallets for users of the payment system 200a.

Also shown in FIG. 13 is a benefits system operator computer 1310. The benefits system operator computer 1310 may be connected to the VAS WSP computer 1302, at least from time to time, via a communication channel 1312; in some embodiments, a one-to-one connection may be provided between the benefits system operator computer 1310 and the VAS WSP computer 1302 as part of a dedicated financial services communications network.

The VAS WSP computer 1302, the benefits system operator computer 1310 and the PSP/acquirer computer 206 may all be constituted by conventional computer hardware, such as that described above in connection with the description of the WSP computer 208 hardware shown in FIG. 5. The VAS WSP computer 1302, the benefits system operator computer 1310 and the PSP/acquirer computer 206 may be programmed to provide system functionality as described herein.

The VAS WSP computer 1302 may store (in a storage medium such as those referred to above in connection with FIG. 5) and may be programmed/controlled by one or more software programs so that the VAS WSP computer 1302 may provide functionality as described herein.

In some embodiments, the wallet services provided by the VAS WSP computer 1302 may entail maintaining one or more digital wallets per user/subscriber for the services of the VAS WSP. In some embodiments, for example, the user 210 may have stored for his/her benefit in the VAS WSP computer 1302 one or more of the following: (a) a rewards wallet, for loyalty points, coupons, promotional payments, etc.; (b) a medical insurance wallet for medical, dental, long term care, and other like benefits; (c) a casualty insurance wallet; and (d) a social benefits wallet (e.g., for social welfare payments, government pension plan benefits, etc.).

Figure 14:
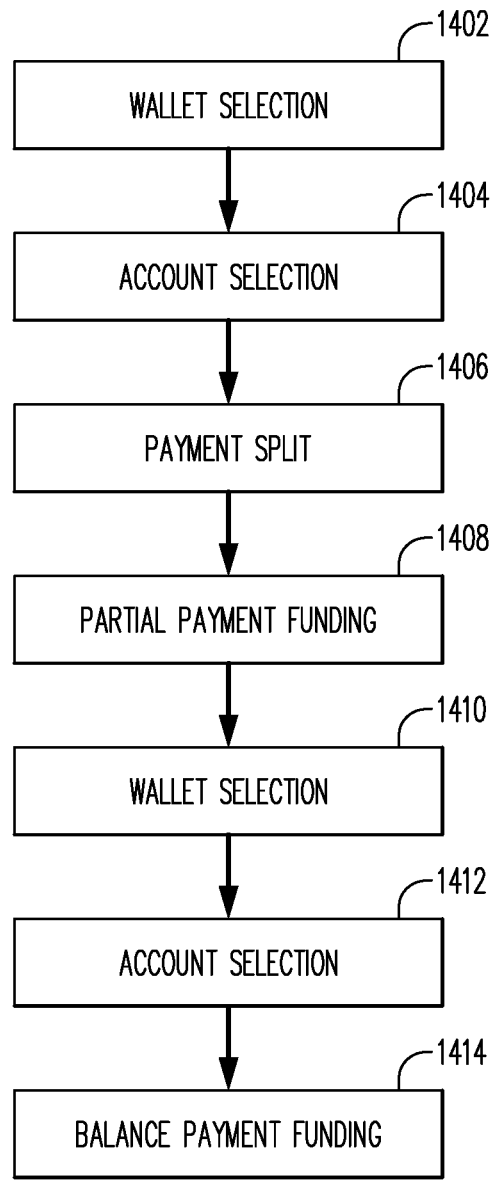
FIG. 14 is a high level flow chart that illustrates a transaction process that may be performed in the system of FIG. 13 in accordance with aspects of the present invention.

FIG. 14 is a high level flow chart that illustrates a transaction process that may be performed in the payment system 200a in accordance with aspects of the present invention.

The process of FIG. 14 may, for example, be triggered by a signal that indicates that the current transaction is eligible for split payment between two or more of the user's digital wallets, such as a benefits account wallet and a payment card account wallet. For example, the signal may be a code provided by the merchant POI terminal 204 and/or may be the identifier for the merchant that operates the merchant POI terminal 204. For example, the signal may identify the merchant as a medical services provider, for which the charges are eligible for partial payment via a medical insurance benefit. In some embodiments, the signal may be received to trigger the process of FIG. 14 at the PSP/acquirer computer 206a.

At block 1402 in FIG. 14, the PSP/acquirer computer 206a selects an appropriate benefits wallet or other digital wallet for the user 210 in response to the triggering signal referred to above. For example, the PSP/acquirer computer 206a may select the user's digital wallet that is appropriate in view of the triggering signal. (For example, the triggering signal may indicate to the PSP/acquirer computer 206a that the merchant is a service provider whose services are eligible for benefits payments. The PSP/acquirer computer 206a may also look up the user (via the URI for the server function in the payment-enabled mobile device 202) to determine that the user is eligible for benefits and has a wallet service provider for the benefits.) Accordingly, the PSP/acquirer computer 206a may then contact the wallet service provider that maintains the selected wallet, assumed in this case to be the operator of the VAS WSP computer 1302. Thus, the PSP/acquirer computer 206a transmits a request to the VAS WSP computer 1302 to download wallet form data for the selected wallet.

The process of FIG. 14 advances from block 1402 to block 1404. At block 1404, the user 210 is permitted to select a funding account from the selected digital wallet. For that purpose, corresponding wallet form data provided by the VAS WSP computer 1302 is transmitted to the payment-enabled mobile device 202. (For example, the wallet form data may be received by the WSP computer 208 directly or indirectly from the VAS WSP computer 1302 and then relayed on from the WSP computer 208 to the payment-enabled mobile device 202. In some embodiments, the VAS WSP computer 1302 transmits the wallet form data to the PSP/acquirer computer 206a, which relays the wallet form data to the WSP computer 208, along with the URI for the server function in the payment-enabled mobile device 202. The WSP computer 208 may then form a secure communication channel with the payment-enabled mobile device 202, in the manner described above in connection with block 120 of FIG. 11.) The wallet form data, when received by the payment-enabled mobile device 202, provides to the user 210 at least one funding account option that is available to the user 210 and represented in the digital wallet selected at block 1402. In some embodiments, the selected digital wallet may contain only one funding account option (e.g., a medical insurance benefits account), and the user selection of that funding account option may occur simply by the user 210 indicating that he/she wishes the funding account in question be applied to a first portion of the transaction amount that is to be funded. In other cases, the selected digital wallet may contain two or more funding account options (e.g., various loyalty points, coupons or promotion accounts available to the user 210) and the user 210 may provide input via the payment-enabled mobile device 202 to indicate the user's selection of one of the funding account options. The resulting account selection signal, indicative of the user's selection of an account (or confirmation that an account is to be used, if it is the only option in the selected digital wallet) may be received by one or more of the WSP computer 208, the PSP/acquirer computer 206a and the VAS WSP computer 1302.

In some embodiments, the account selection signal may be transmitted from the payment-enabled mobile device 202 via the secure communication channel 222 to the WSP computer 208. The WSP computer 208 may relay the account selection signal to the PSP/acquirer computer 206a, which in turn transmits the account selection signal to the VAS WSP computer 1302.

Figure 15:
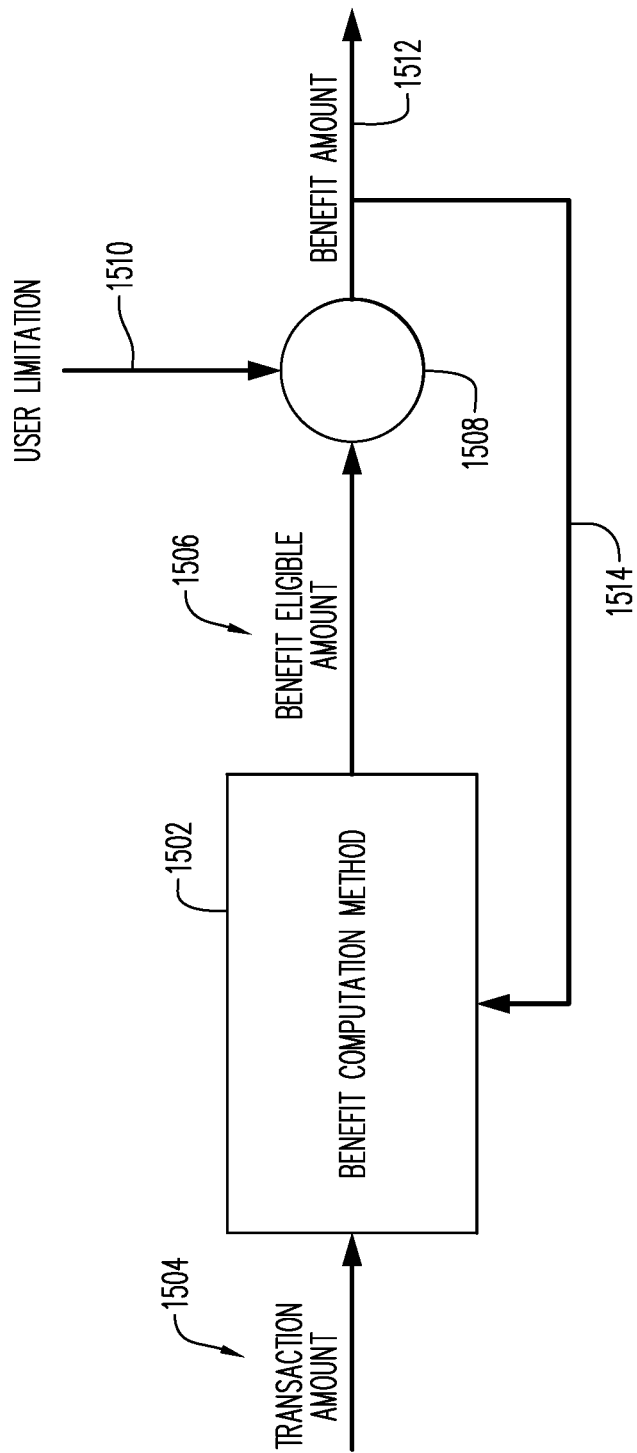
FIG. 15 schematically illustrates some details of the process of FIG. 14.

Then, at block 1406 in FIG. 14, the required payment for the current transaction is split. FIG. 15 schematically illustrates one example process by which the payment split may take place. (This process may be performed, for example, by the VAS WSP computer 1302.) In FIG. 15, block 1502 represents a benefit computation method that may be applicable to the funding account selected at 1404. The benefit computation method block 1502 may receive as an input (as indicated at 1504) the total amount that is to be paid for the current transaction (i.e., the transaction amount). The output (reference numeral 1506) from the benefit computation method block 1502 may be the maximum amount that the transaction is eligible to receive in funding from the selected funding account. At a node indicated by reference numeral 1508, an input 1510 may be received to indicate the user's preference that less than the entire available benefit be drawn from the selected funding account. (That is, the process of FIG. 15 gives the user 210 an option to elect to use less than the entire benefit for which he/she is eligible for the current transaction; information may be presented to the user 210 concerning this option via the payment-enabled mobile device 202, and the payment-enabled mobile device 202 may receive input from the user 210 to indicate that the user elects to receive the maximum benefit available, or to indicate a smaller amount of the benefit that the user 210 opts to apply to the current transaction. The communications to support the user input may run between the VAS WSP computer 1302 and the payment-enabled mobile device 202, via the PSP/acquirer computer 206a and the WSP computer 208.) The output 1512 from the node 1508 is the smaller amount of the inputs 1506 and 1510, and becomes the amount to be funded for the current transaction from the selected funding account. The feedback path indicated at 1514 represents updating (reduction) of the available balance in the selected funding account.

A consequence of the process of FIG. 15 is that a partial transaction amount is determined, which partial transaction amount is funded from the funding account option selected (or confirmed) by the user 210 at block 1404. Block 1408 in FIG. 14 represents the partial funding of the transaction amount, by the amount output from node 1508 in FIG. 15, from the funding account selected at block 1404.

Following block 1408 in FIG. 14 is block 1410. At block 1410, another one of the user's digital wallets may be selected by the PSP/acquirer computer 206*a*. For example, the PSP/acquirer computer 206*a* may next select the user's digital wallet maintained at the WSP computer 208.

With the second digital wallet having been selected, the process of FIG. 14 advances to block 1412. At block 1412, the user 210 is permitted to select a funding account from the second digital wallet that was selected. To allow the user to select the next funding account, wallet form data that corresponds to the second selected digital wallet is transmitted to the payment-enabled mobile device 202. The latter wallet form data, when received by the payment-enabled mobile device 202, provides to the user 210 at least one, and possibly two or more, funding account options that are available to the user and are represented by the second selected digital wallet (i.e., the digital wallet selected at block 1410). Assuming that two or more funding account options (say, two or more payment card accounts) are represented in the second selected digital wallet, the user interface of the payment-enabled mobile device 202 may present those options to the user 210, and may receive input from the user 210 to indicate the user's selection of an account from among those options. The resulting account selection signal, including data indicative of the user's selection of the latter account, may be received by one or more of the WSP computer 208, the PSP/acquirer computer 206*a* and the VAS WSP computer 1302. In some embodiments, if the second selected wallet was maintained by the WSP computer 208, the balance of the operation corresponding to block 1412 may include operations such as those described above in connection with blocks 1130, 1132, 1134, 1136 and 1138 in FIG. 11B, resulting in funding of the balance of the transaction amount (block 1414, FIG. 14) from a payment card account selected by the user 210 at block 1412.

In the above discussion of FIG. 14, it was stated that the PSP/acquirer computer 206*a* handled selection of a first one of the user's digital wallets and thereafter a second one of the user's digital wallets. Alternatively, however, in some embodiments another entity in the payment system 200*a* may perform one or both of the wallet selections. For example, the user 210 may make one or both of the wallet selections, possibly with guidance from the PSP/acquirer computer 206*a* via a communication path running through the WSP computer 208 to the payment-enabled mobile device 202.

Figure 16:
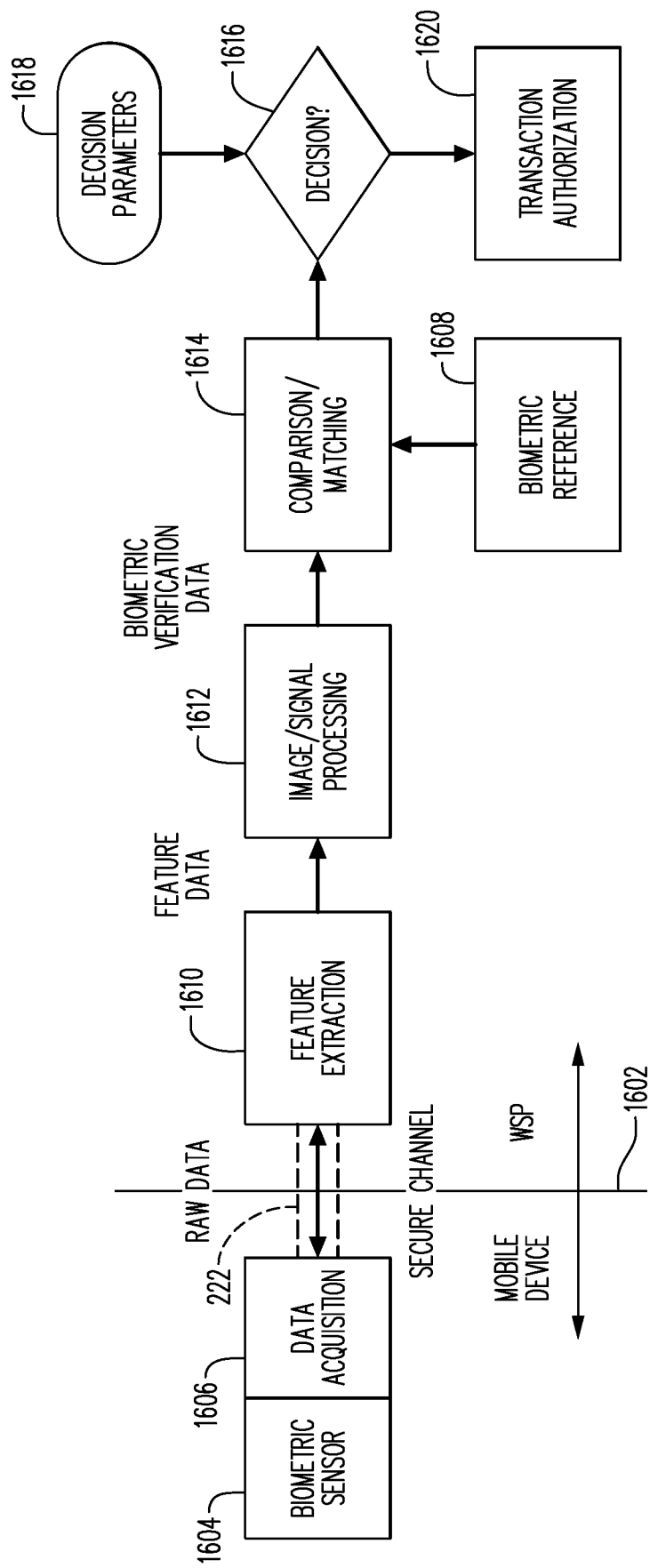
FIG. 16 schematically illustrates a biometric-based cardholder verification method (CVM) that may be performed according to aspects of the invention in the system of FIG. 2 or FIG. 13.

As noted above (e.g., in connection with discussion of block 1124 in FIG. 11B and/or the discussion of the wallet selection application program 904 in relation to FIG. 9), the user's selection of an account (e.g., a payment card account) from the user's digital wallet may be accompanied by a requirement that the user participate in a CVM operation. FIG. 16 schematically illustrates a biometric-based cardholder verification method (CVM) that may be performed according to aspects of the invention in the payment systems 200 or 200*a* of FIG. 2 or FIG. 13.

In FIG. 16, components to the left of dividing line 1602 may be part of the payment-enabled mobile device 202 shown in FIG. 2, while components to the right of the dividing line 1602 may be part of the WSP computer 208. In this arrangement, the payment-enabled mobile device 202 may serve as a proving device, and WSP computer 208 may serve as a verifying device, for the biometric CVM operation. For example, as part of the payment-enabled mobile device 202 there may be a biometric sensor 1604 and a data acquisition unit 1606. (In some embodiments, the biometric sensor may be constituted by the microphone 320 (FIG. 3) or a camera (not shown) included in the payment-enabled mobile device 202.) The payment-enabled mobile device 202 may perform the relatively limited function of acquiring the raw biometric data and sending it to the WSP computer 208 via the communication channel 222. In this embodiment, the payment-enabled mobile device 202 need not store any biometric reference data, and accordingly need not be personalized for biometric CVM. This may tend to reduce or eliminate the need for a large permanent memory in the payment-enabled mobile device 202. It is also advantageous that the cryptographically secured communication channel 222 is available between the payment-enabled mobile device 202 and the WSP computer 208 to allow for transmission of the raw biometric data from the former device to the latter device.

The reference data for the biometric CVM, in this embodiment, may be stored at the WSP computer 208, as indicated by block 1608 in FIG. 16. Processing of the raw biometric data received by the WSP computer 208 from the payment-enabled mobile device 202 may be performed by functional blocks such as feature extraction block 1610, image signal processing block 1612 and comparison/matching block 1614. A decision function 1616 on the WSP computer side may determine whether the CVM is valid based on output from the comparison/matching block 1614 and based on previously stored decision parameters indicated at 1618 in FIG. 16. Assuming that the decision parameters are satisfied, the output from the decision function 1616 may be authorization of the transaction, as indicated at 1620.

With the arrangement shown in FIG. 16, biometric data captured by the payment-enabled mobile device 202 is not analyzed at the payment-enabled mobile device 202, but rather un-analyzed biometric data is transmitted from the payment-enabled mobile device 202 to be received by the WSP computer 208, and to be analyzed and verified at the WSP computer 208. This arrangement may result in a high degree of flexibility in terms of permitting various different types of biometric CVM to be employed for different accounts in the user's digital wallet, and/or for new types of biometric CVM to be introduced into the operations of the payment system 200*a*. The flexibility available for applying different types of biometric CVM may also be utilized to match the type of biometric CVM capability supported by the particular mobile device to be used in the transaction. Also, since the WSP computer 208 is highly secure, it is quite unlikely that the user's biometric reference data would be compromised, as could more easily occur if the biometric reference data were present in the payment-enabled mobile device 202 and the latter were lost or stolen.

Figure 17:
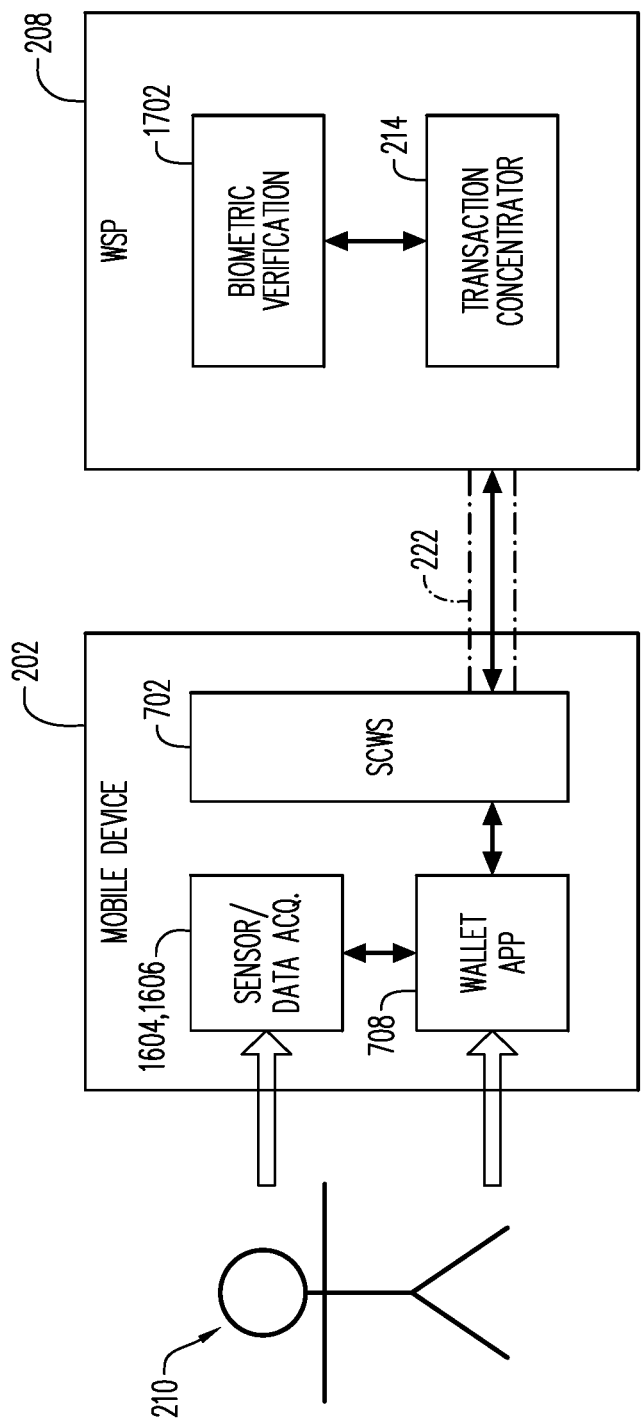
FIG. 17 is a block diagram that illustrates aspects of the biometric-based CVM of FIG. 16.

FIG. 17 is a block diagram that illustrates aspects of the biometric-based CVM of FIG. 16. In addition, FIG. 17 may aid in illustrating how a biometric-based CVM as in FIG. 16 may be integrated into the transaction process described above primarily with reference to FIGS. 2, 11A and 11B.

FIG. 17 may be considered to represent a subset of the apparatus of FIG. 2, as modified to accommodate a biometric CVM process as described above in connection with FIG. 16. FIG. 17 shows the following features shown in and discussed above in connection with FIG. 2—the payment-enabled mobile device 202, the WSP computer 208, and the communication channel 222. Further, as part of the payment-enabled mobile device 202, FIG. 17 also shows the following software elements that were discussed above in connection with FIG. 7—the consumer device server function 702 and the wallet selection application 708. Still further, and also as part of the payment-enabled mobile device 202, FIG. 17 shows the components 1604, 1606 (biometric sensor and biometric data acquisition) referred to in the above discussion of FIG. 16. Also, biometric verification block 1702 in FIG. 17, which is shown as part of the WSP computer 208, represents the functional blocks shown in FIG. 16 to the right of dividing line 1602. Also seen in FIG. 17, as part of the WSP computer 208 is the transaction concentrator block 214 referred to above in connection with FIG. 2. In the apparatus as illustrated in FIG. 17, the transaction concentrator block 214 is shown as being in communication with the biometric verification block 1702 of the WSP computer 208.

In operation of the apparatus of FIG. 17 (and also referring to blocks 1124, 1126 and 1128 of FIG. 11B), the user 210 may perform account selection via the wallet selection application 708, and may present his/her biometric feature to the biometric sensor 1604. After acquisition of the user's biometric data, the latter is transmitted—together with a biometric technology identifier (e.g., fingerprint, voice recognition, finger vein, retina, facial geometry, etc.) to the wallet selection application 708. After gathering the user's account selection, the biometry identifier and the raw biometric data, the wallet selection application 708 sends them via the consumer device server function 702 and the secure channel 222 to the WSP computer 208.

Based on the biometry identifier, the WSP computer 208 chooses the appropriate biometric data processing algorithm for the raw biometric data and the appropriate stored biometric reference data repository. Within the selected biometric data repository, the particular set of biometric reference data for the user in question may be retrieved based on the URI for the consumer device server function 702 in the payment-enabled mobile device 202. The biometric verification block 1702 then applies the biometric verification process illustrated in FIG. 16 to the raw data. Assuming the result of the process is, "valid", then the transaction concentrator block 214 may trigger the authorization request(s) as referred to above in connection with block 1130 of FIG. 11B.

Figure 18:
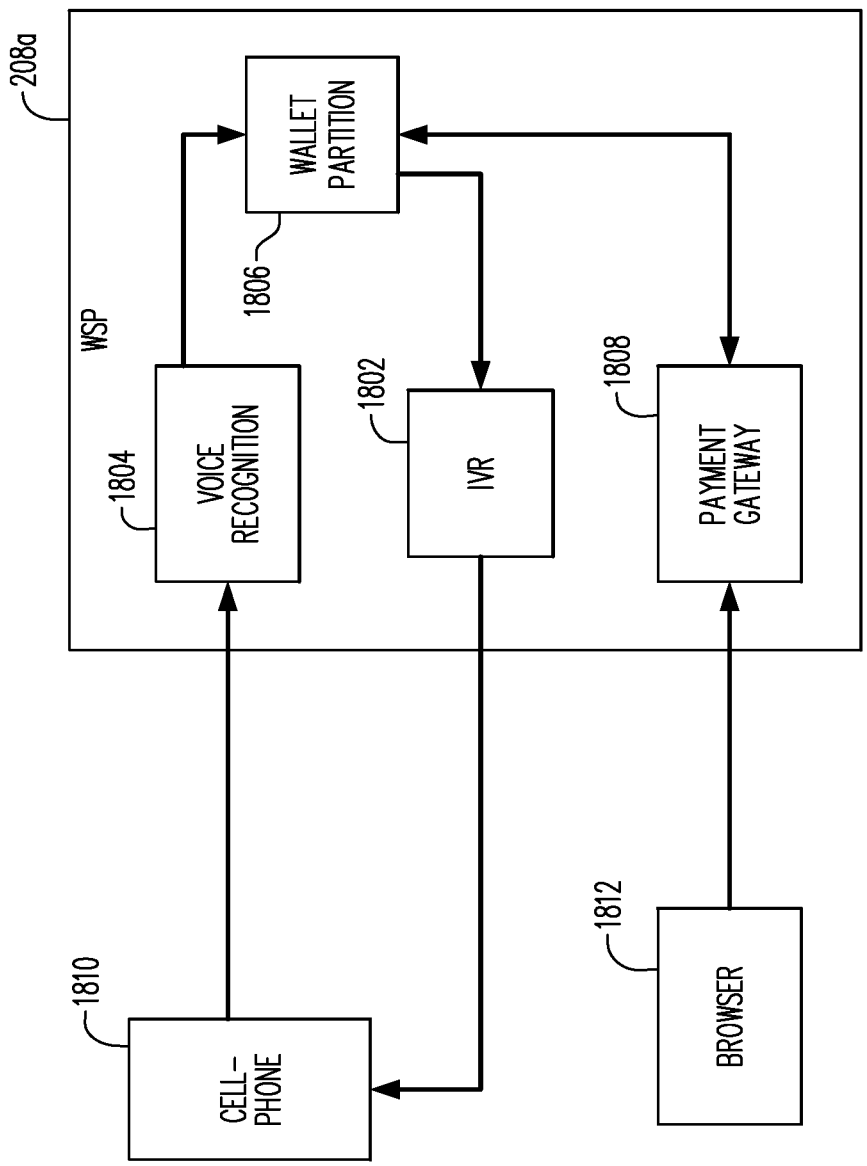
FIG. 18 is a block diagram that illustrates an alternative CVM that may be performed according to aspects of the invention.

FIG. 18 is a block diagram that illustrates an alternative CVM that may be performed according to aspects of the invention.

FIG. 18 may aid in illustrating a CVM that may be particularly suitable for use in remote (e-commerce) transactions, although it may also be useful for an in-store transaction that is not consummated via a local POS terminal. FIG. 18 shows a modified version (reference numeral 208a) of the WSP computer referred to above. The WSP computer 208a may include an interactive voice response (IVR) unit 1802, a voice recognition unit 1804, a wallet partition unit 1806 and a payment gateway function 1808. The WSP computer 208a may interact with a cell-phone 1810 via the IVR unit 1802 and the voice recognition unit 1804. The cell-phone 1810 may or may not be a smartphone, and may or may not be a payment-enabled mobile device (such as described hereinabove). The WSP computer 208a may also interact with a conventional browser 1812 via the payment gateway function 1808. (The browser 1812 may run on a conventional personal computer, tablet, smartphone or the like, which are not separately shown. The browser 1812 may receive input from the same individual (not shown) who owns and uses the cell-phone 1810. The browser may be configured so that it "knows" the telephone number for the cell-phone 1810.)

In operation of the apparatus of FIG. 18, the browser 1812 may retrieve an ordering page from the merchant e-commerce site (not shown), and may allow the user to select one or more items for purchase, as indicated via the browser to the e-commerce site. The e-commerce site may then compute the amount due for the transaction and submit the transaction amount to the browser. The browser may then send the transaction amount, the cell-phone telephone number and possibly other transaction information as well to the payment gateway function 1808 of the WSP computer 208a.

Using the cell-phone telephone number, the payment gateway function 1808 retrieves the digital wallet for the user from the wallet partition unit 1806, and from the user's digital wallet the WSP computer 208a generates wallet form data, which is supplied to the IVR unit 1802 together with the cell-phone telephone number. The IVR unit 1802 calls the cell-phone 1810 and audibly prompts the user to make an account selection based on the wallet form data. The user responds by spoken utterance into the cell-phone 1810 to indicate his/her payment card account selection. The voice utterance is sent from the cell-phone 1810 to the voice recognition unit 1804 of the WSP computer 208a. The voice recognition unit performs both of the following on the basis of the voice utterance—(a) identifying the user based on a voice sample reference previously stored in a reference data repository on the WSP computer 208a (where the reference was associated with the cell-phone telephone number)—i.e., in effect CVM; and (b) detecting the user's selection of a payment card account from the user's digital wallet based on speech content recognition as applied to the voice utterance received from the cell-phone 1810. If the CVM is found "valid", then the account selection is passed on to a wallet unit in the WSP computer 208a. The wallet unit then triggers an authorization request for the selected payment card account (or more than one authorization request, if the user elected to split payment among two or more of his/her payment card accounts). The WSP computer 208a then receives an authorization response from the payment card account issuer (or more than one, if more than one account is being used). The result of the authorization response is provided to the payment gateway function 1808 of the WSP computer 208a. If the transaction is approved, the payment gateway provides an acknowledgment message accordingly to the merchant e-commerce site, such that the transaction is successfully concluded.

Returning the discussion now to the payment-enabled mobile device 202, it has been noted above that in some embodiments the device 202 may be physically constituted by smartphone hardware. Alternatively, however, the device 202 may be an IC card of the type that includes a display and keyboard. In such a case, for example, the device 202 may communicate with the WSP computer 202 via the POI terminal. In still other embodiments, the IC card need not have a keyboard or display. The IC card, which may be a contactless card or a contact card, may be in communication with the POI terminal, which may provide a user interface for the card and for selection of wallet account(s).

As used herein and in the appended claims, the term "computer" should be understood to encompass a single computer or two or more computers in communication with each other.

As used herein and in the appended claims, the term "processor" should be understood to encompass a single processor or two or more processors in communication with each other.

As used herein and in the appended claims, the term "memory" should be understood to encompass a single memory or storage device or two or more memories or storage devices.

The flow charts and descriptions thereof herein should not be understood to prescribe a fixed order of performing the method steps described therein. Rather the method steps may be performed in any order that is practicable.

As used herein and in the appended claims, the term "payment card system account" includes a credit card account or a deposit account that the account holder may access using a debit card. The terms "payment card system account" and "payment card account" are used interchangeably herein. The term "payment card account number" includes a number that identifies a payment card system account or a number carried by a payment card, or a number that is used to route a transaction in a payment system that handles debit card and/or credit card transactions. The term "payment card" includes a credit card or a debit card.

As used herein and in the appended claims, the term "payment card system" refers to a system for handling purchase transactions and related transactions. An example of such a system is the one operated by MasterCard International Incorporated, the assignee of the present disclosure. In some embodiments, the term "payment card system" may be limited to systems in which member financial institutions issue payment card accounts to individuals, businesses and/or other organizations.

Although the present invention has been described in connection with specific exemplary embodiments, it should be understood that various changes, substitutions, and alterations apparent to those skilled in the art can be made to the disclosed embodiments without departing from the spirit and scope of the invention as set forth in the appended claims.

What is claimed is:

1. A method comprising:
   receiving, via a client program on a wallet service provider computer, a message containing an internet address for a server function present in a payment-enabled mobile device that includes a wallet application installed therein which is hosted by the wallet service provider computer;
   in response to the received message, generating a Hypertext Transfer Protocol (HTTP) request via the client program on the wallet service provider computer for the server function present in the payment-enabled mobile device, wherein the HTTP request comprises a plurality of imbricated sub-commands corresponding to a plurality of target resources within a namespace tree of the server function present in the payment-enabled mobile device;
   transmitting the HTTP request with the plurality of imbricated sub-commands to the server function present in the payment-enabled mobile device by establishing a cryptographically secured HTTP communication channel between the wallet service provider computer and the server function present in the payment enabled mobile device;
   receiving, from the server function, via the established cryptographically secured HTTP communication channel, a selection of a payment card included within the wallet application installed on the payment-enabled mobile device and hosted by the wallet service provider computer and authentication data of a user of the mobile device; and
   transmitting, via a payment network, a payment authorization request message based on the selected payment card and the authentication data;
   receiving, in the wallet service provider computer, an authorization response with respect to the payment authorization request message.

2. The method of claim 1, wherein the received message also contains (a) transaction detail data for a payment transaction; and (b) transaction context data for the payment transaction;
   and the method further comprising:
   receiving, via the client program on the wallet service provider computer, (i) a copy of the transaction detail data and (ii) a copy of the transaction context data; and
   verifying, by the wallet service provider computer, that the copy of the transaction detail data matches the transaction detail data contained in the received message and that the copy of the transaction context data matches the transaction context data contained in the received message.

3. The method of claim 2, further comprising:
   receiving, via the client program on the wallet service provider computer, an account selection signal, the account selection signal selecting a payment card account from among a plurality of payment card accounts within the wallet application hosted by the wallet service provider computer for a user of the payment-enabled mobile device; and
   routing the payment network authorization request message, from the wallet service provider computer, to charge the payment transaction to the selected payment card account.

4. The method of claim 3, further comprising:
   transmitting a transaction confirmation message from the wallet service provider computer, the transaction confirmation message addressed to a point of interaction (POI) device indicated by the transaction context data.

5. The method of claim 1, further comprising:
   receiving, via the client program on the wallet service provider computer, input of un-analyzed biometric data provided by the user to the payment-enabled mobile device; and
   analyzing the un-analyzed biometric data by the wallet service provider to verify an identity of the user.

6. The method of claim 5, wherein the un-analyzed biometric data represents a voice signal representing audible voice input provided from the user to the payment-enabled mobile device, the voice signal indicating the user's selection of a payment card account from among a plurality of payment card accounts within the wallet application hosted by the wallet service provider computer for the user; and
   the method further comprising: implementing, by the wallet service provider, the payment card account selection indicated by the voice signal.

7. The method of claim 1, wherein a first imbricated sub-command requests input for selection of a preferred payment card from the user, and a second imbricated sub-command requests one or more of a PIN input and a biometric input from the user.

8. An apparatus comprising:
   a processor; and
   a memory in communication with the processor, the memory storing program instructions which when executed by the processor cause the processor to perform of:
   receiving, via a client program, a message containing an internet address for a server function present in a payment-enabled mobile device that includes a wallet application installed therein which is hosted by a wallet service provider computer;

in response to the received message, generating a Hypertext Transfer Protocol (HTTP) request via the client program on the wallet service provider computer for the server function present in the payment-enabled mobile device, wherein the HTTP request comprises a plurality of imbricated sub-commands corresponding to a plurality of target resources within a namespace tree of the server function present in the payment-enabled mobile device;

transmitting the HTTP request with the plurality of imbricated sub-commands to the server function present in the payment-enabled mobile device by establishing a cryptographically secured HTTP communication channel between the wallet service provider computer and the server function present in the payment enabled mobile device;

receiving, from the server function, via the established cryptographically secured HTTP communication channel, a selection of a payment card included within the wallet application installed on the payment-enabled mobile device and hosted by the wallet service provider computer and authentication data of a user of the mobile device; and transmitting, via a payment network, a payment authorization request message based on the selected payment card and the authentication data;

receiving, in the wallet service provider computer, an authorization response with respect to the payment authorization request message.

9. The apparatus of claim 8, wherein:

the received message also contains (a) transaction detail data for a payment transaction; and (b) transaction context data for the payment transaction;

and the program instructions further cause the processor to perform operations as follows:

receiving via the client program, (i) a copy of the transaction detail data and (ii) a copy of the transaction context data; and verifying that the copy of the transaction detail data matches the transaction detail data contained in the received message and that the copy of the transaction context data matches the transaction context data contained in the received message.

10. The apparatus of claim 9, wherein the program instructions further cause the processor to perform operations as follows:

receiving via the client program, an account selection signal, the account selection signal for selecting a payment card account from among a plurality of payment card accounts within the wallet application for a user of the payment-enabled mobile device; and routing the payment network authorization request message to charge the payment transaction to the selected payment card account.

11. A computing system comprising:

a network interface configured to receive a message from a merchant payment terminal that includes an internet address hosted by a mobile device; and a processor configured to establish a cryptographically secured Hypertext Transfer Protocol (HTTP) session between an HTTP server function of the mobile device and the computing system via the internet address, transmit, via the established cryptographically secured communication channel, to the HTTP server function hosted by the mobile device, a generated HTTP request that comprises a plurality of imbricated sub-commands corresponding to a plurality of target resources within a namespace tree of the server function present in the payment-enabled mobile device;

receive, via the established cryptographically secured HTTP communication channel, a selection of a primary account number (PAN) from an instance of a wallet application running the HTTP server function, on the mobile device and authentication data of a user of the mobile device, and transmit a payment authorization request to an issuer of the PAN via a payment network based on transaction details included in the received message and the authentication data received from the instance of the wallet application on the mobile device;

receive, in the computing system, an authorization response with respect to the payment authorization request message.

12. The computing system of claim 11, wherein the processor is further configured to receive a payment authorization response from the issuer of the PAN, and transmit the payment authorization response to the merchant payment terminal.

13. The computing system of claim 11, wherein the processor is further configured to retrieve wallet application data of the mobile device from storage, and transmit the wallet application data to the mobile device via the HTTP session, where the wallet application data permits a user of the mobile device to select from among one or more PANs included in the wallet application.

\* \* \* \* \*